(12) United States Patent
Ohmoto

(10) Patent No.: US 8,441,738 B2
(45) Date of Patent: May 14, 2013

(54) ZOOM LENS AND IMAGE PICKUP APPARATUS HAVING THE SAME

(75) Inventor: Junichi Ohmoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/364,926

(22) Filed: Feb. 2, 2012

(65) Prior Publication Data

US 2012/0200940 A1 Aug. 9, 2012

(30) Foreign Application Priority Data

Feb. 7, 2011 (JP) ................................. 2011-023699

(51) Int. Cl.
*G02B 15/14* (2006.01)
(52) U.S. Cl.
USPC .......................................... 359/683; 359/689
(58) Field of Classification Search .................. 359/682, 359/683, 689
See application file for complete search history.

(56) References Cited

U.S. PATENT DOCUMENTS

| 6,594,087 | B2 | 7/2003 | Uzawa et al. |
| 7,177,092 | B2 | 2/2007 | Satori et al. |
| 7,304,805 | B2 | 12/2007 | Endo et al. |

FOREIGN PATENT DOCUMENTS

JP 2008-233161 A 10/2008

*Primary Examiner* — Jack Dinh
(74) *Attorney, Agent, or Firm* — Canon USA Inc. IP Division

(57) ABSTRACT

A zoom lens includes, in order from the object side to the image side, a first lens unit having a positive refractive power, a second lens unit having a negative refractive power, and a rear group including one or more lens units. An aperture stop is included on the image side of the second lens unit, and the second lens unit and at least one of the lens units included in the rear group move during zooming. The Abbe number vdj1 and the partial dispersion ratio θgFj1 of a material of a refractive optical element j1 having a negative refractive power included in the second lens unit, the focal length fj1 of the refractive optical element j1, the focal length f2 of the second lens unit, and the anomalous partial dispersion ratio ΔθgFj1 of the refractive optical element j1 are set appropriately.

6 Claims, 21 Drawing Sheets

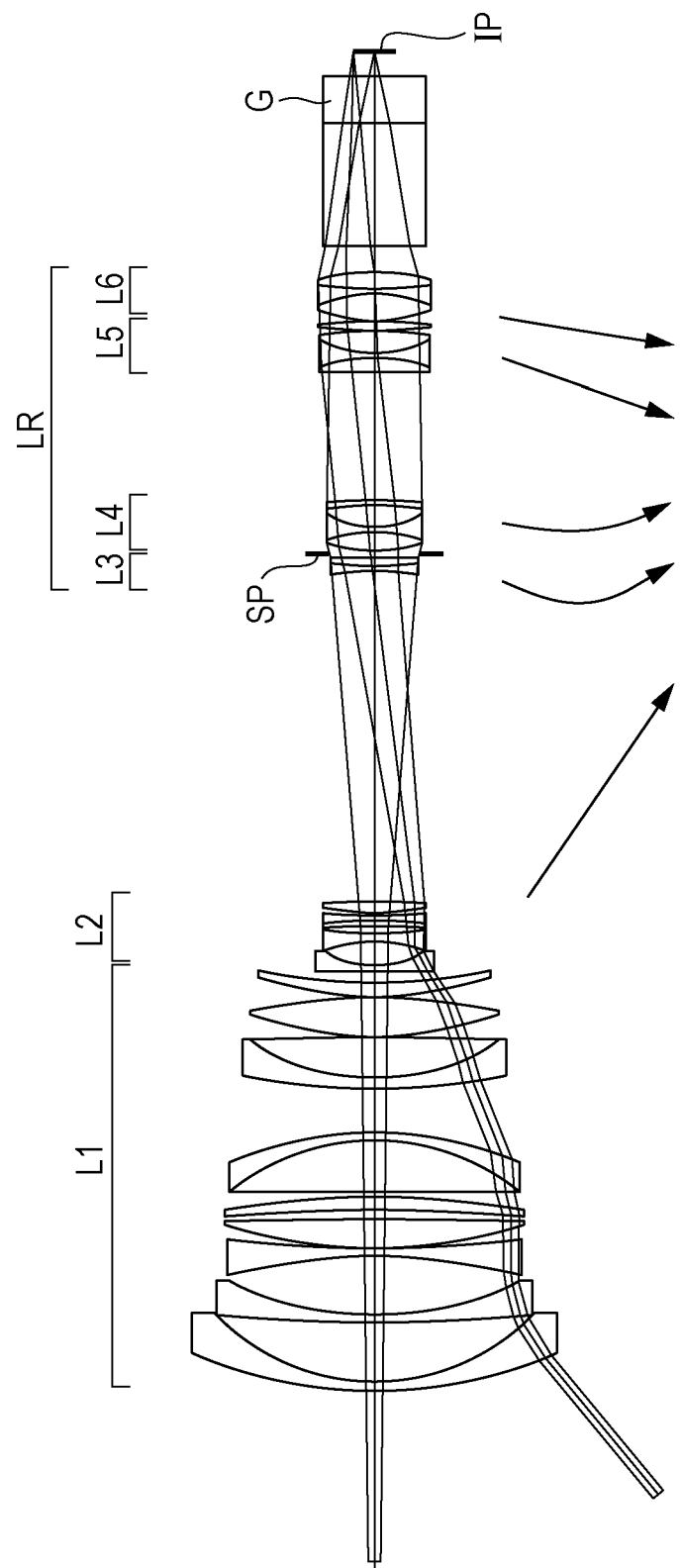

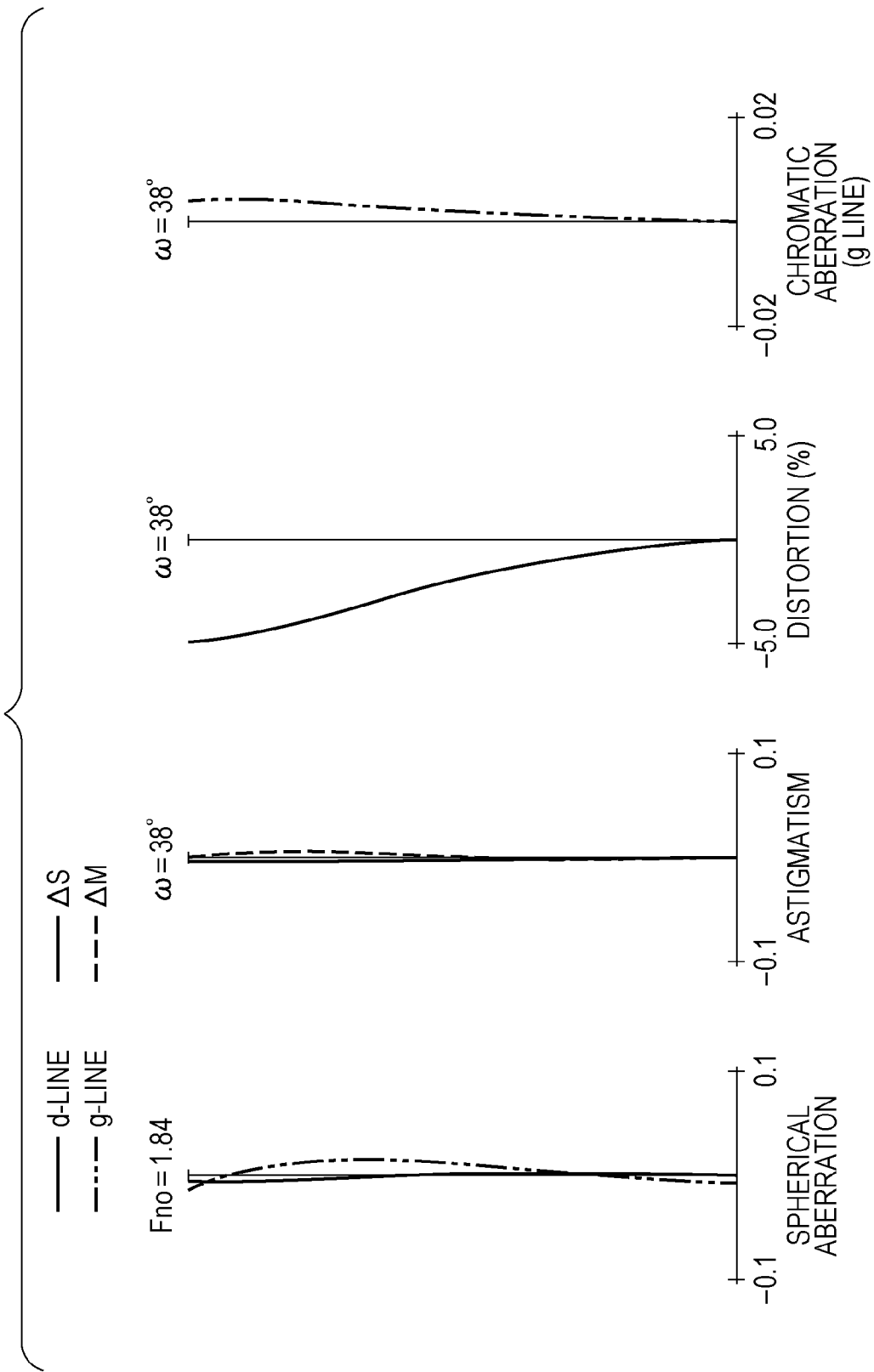

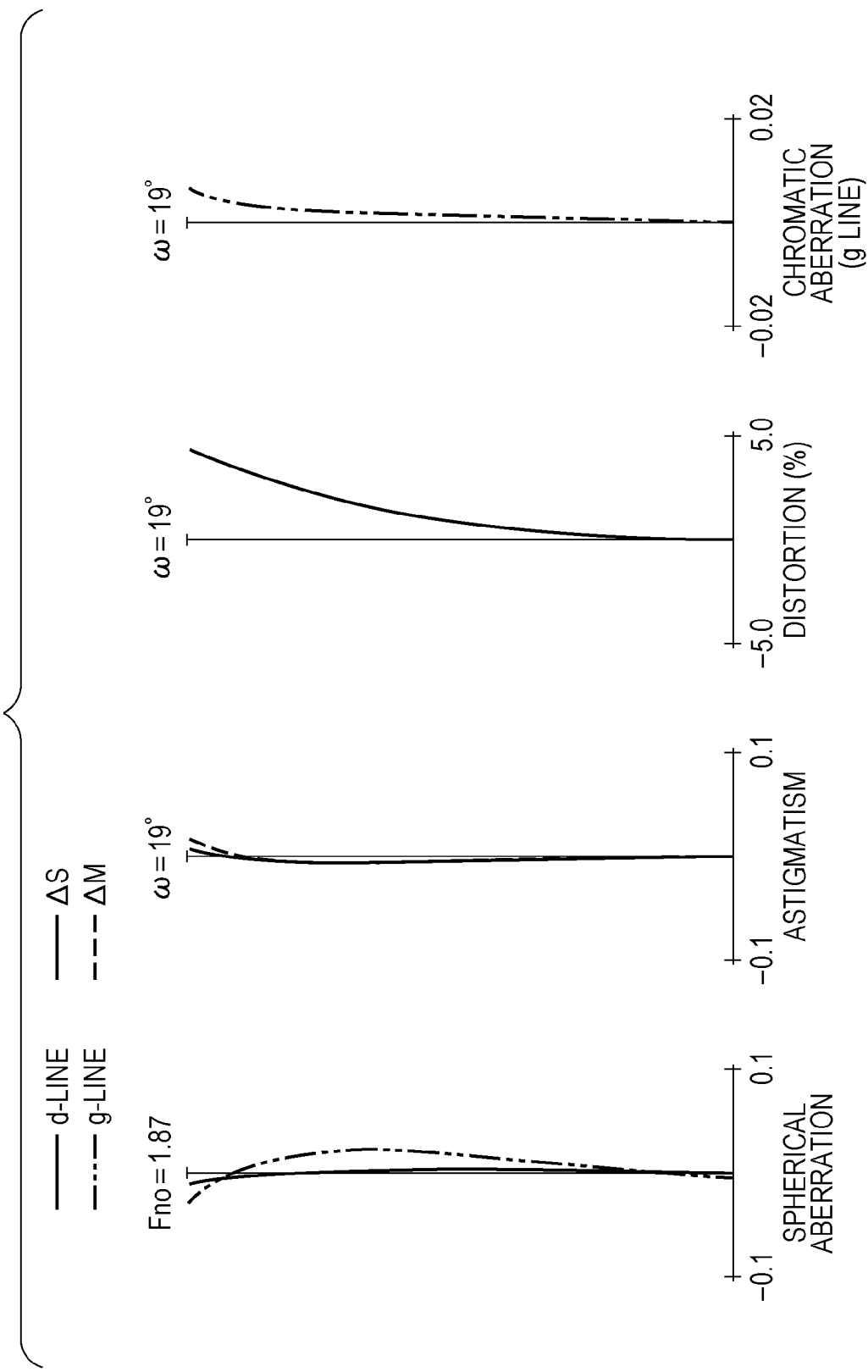

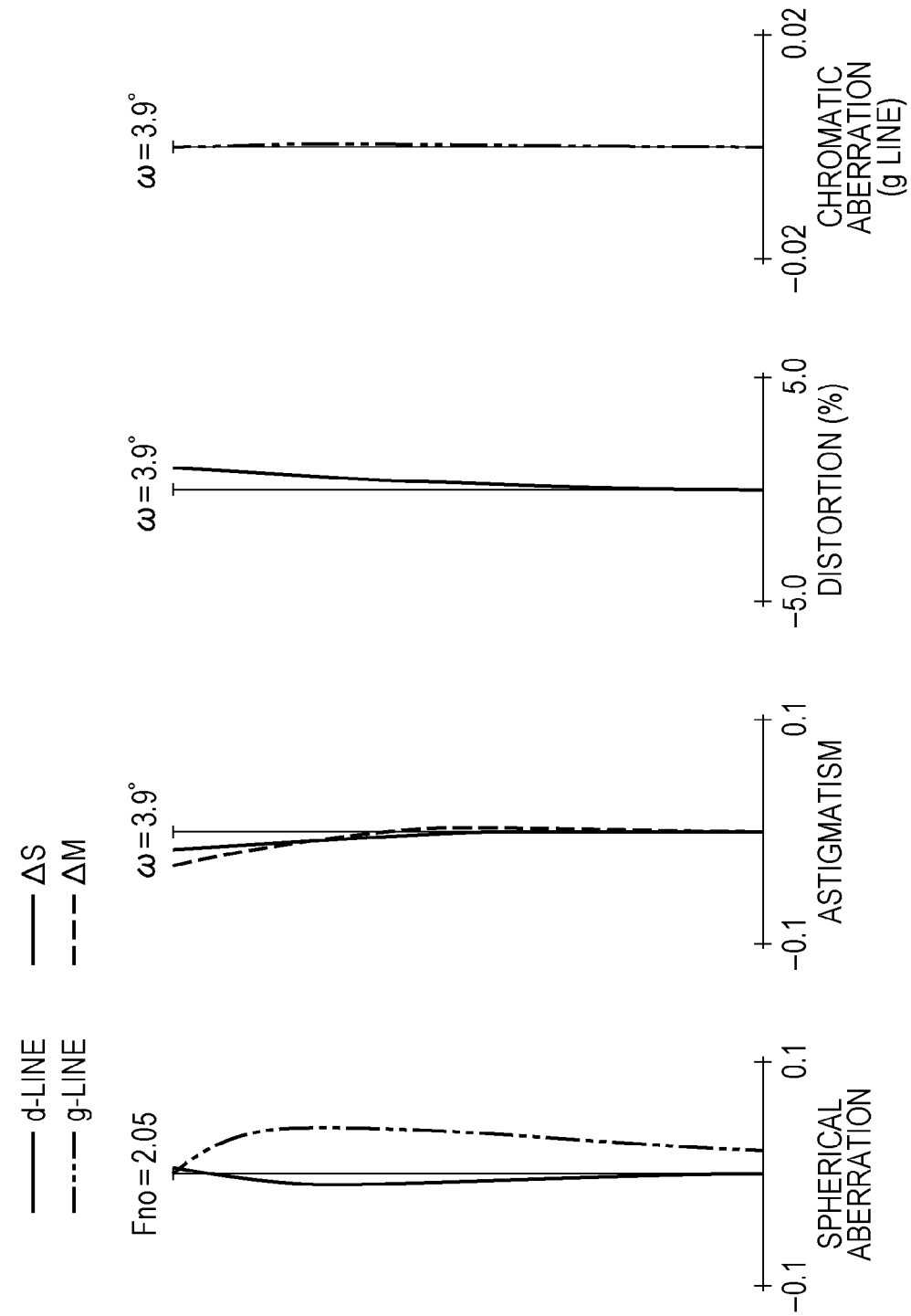

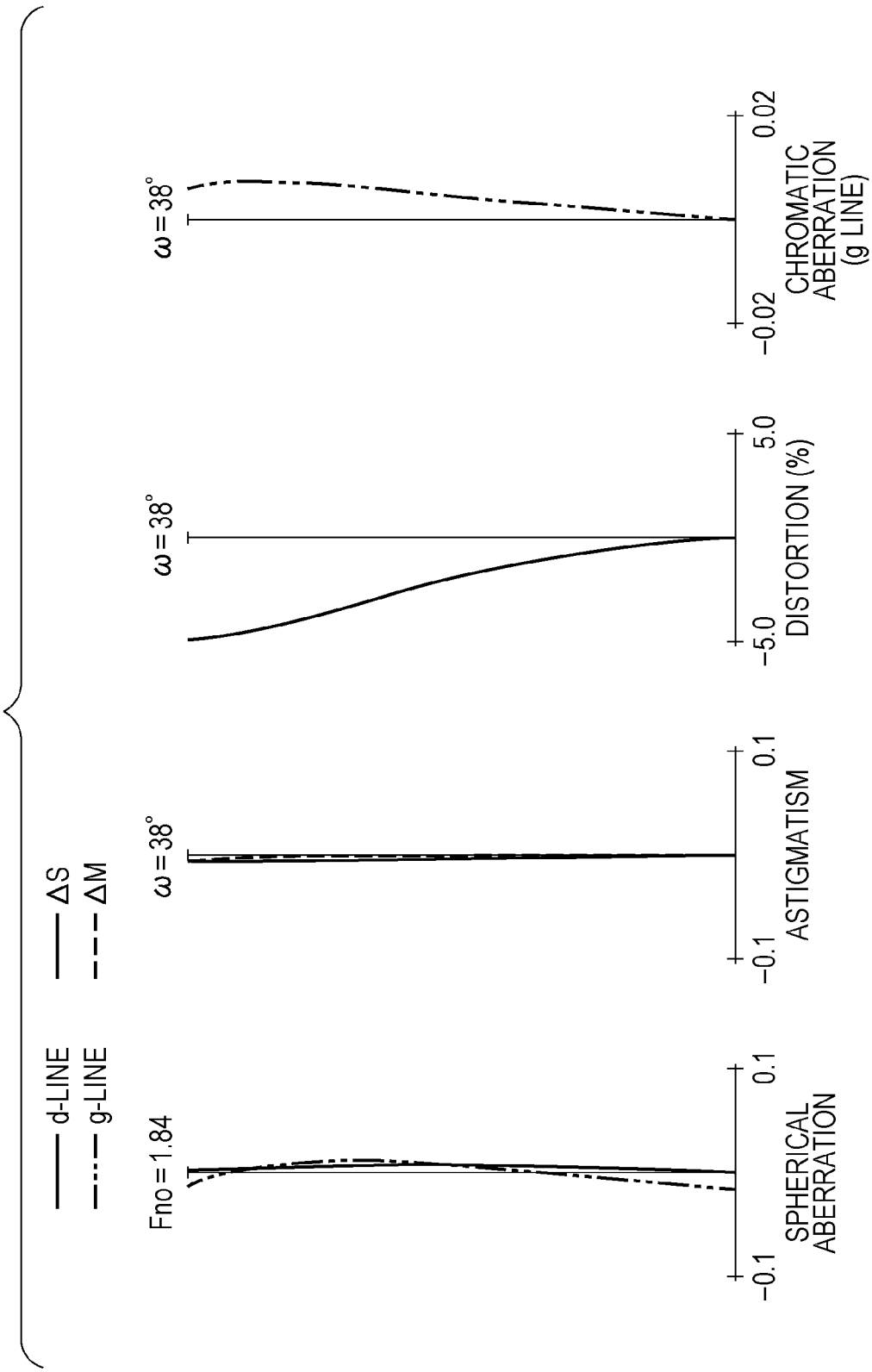

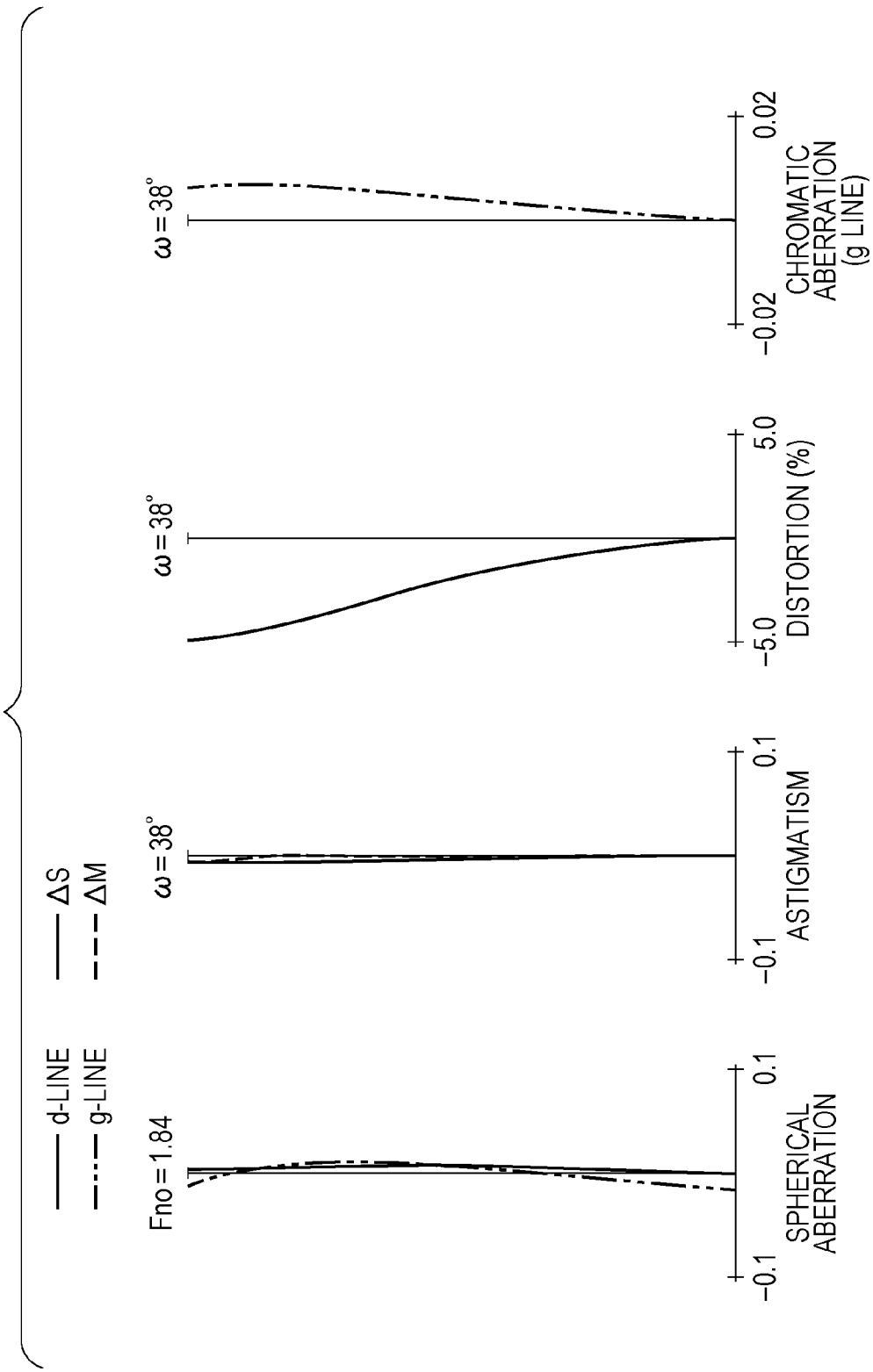

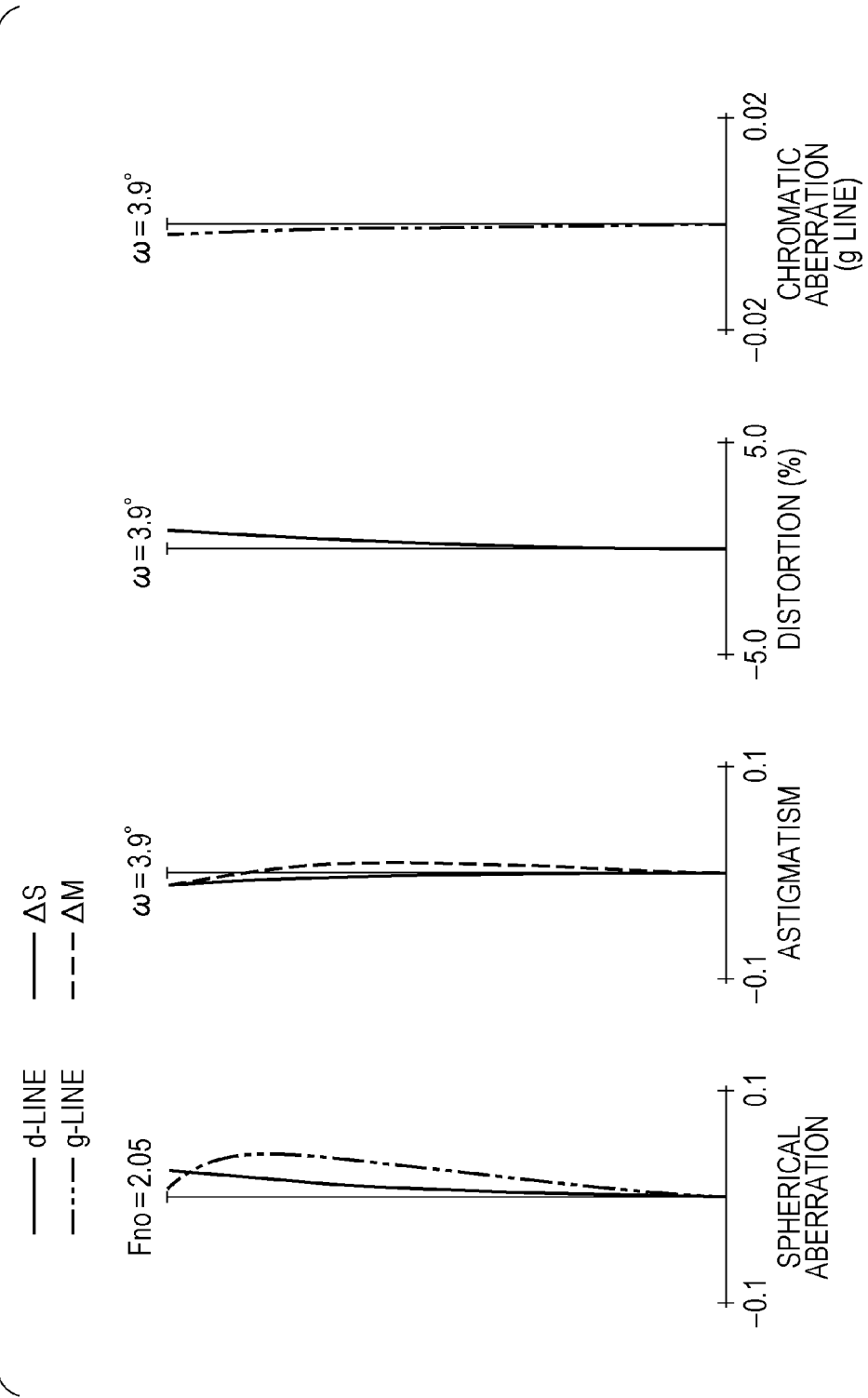

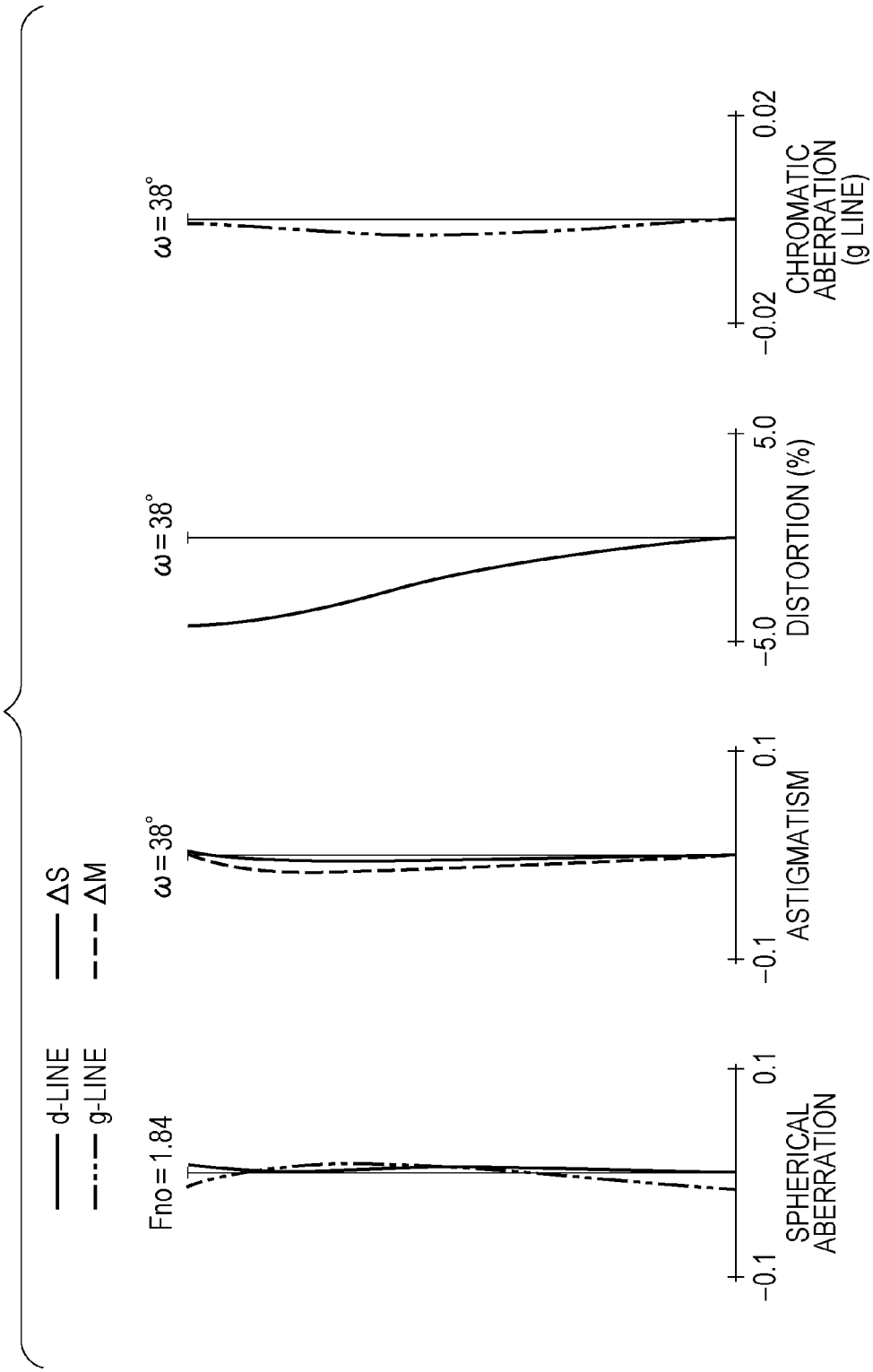

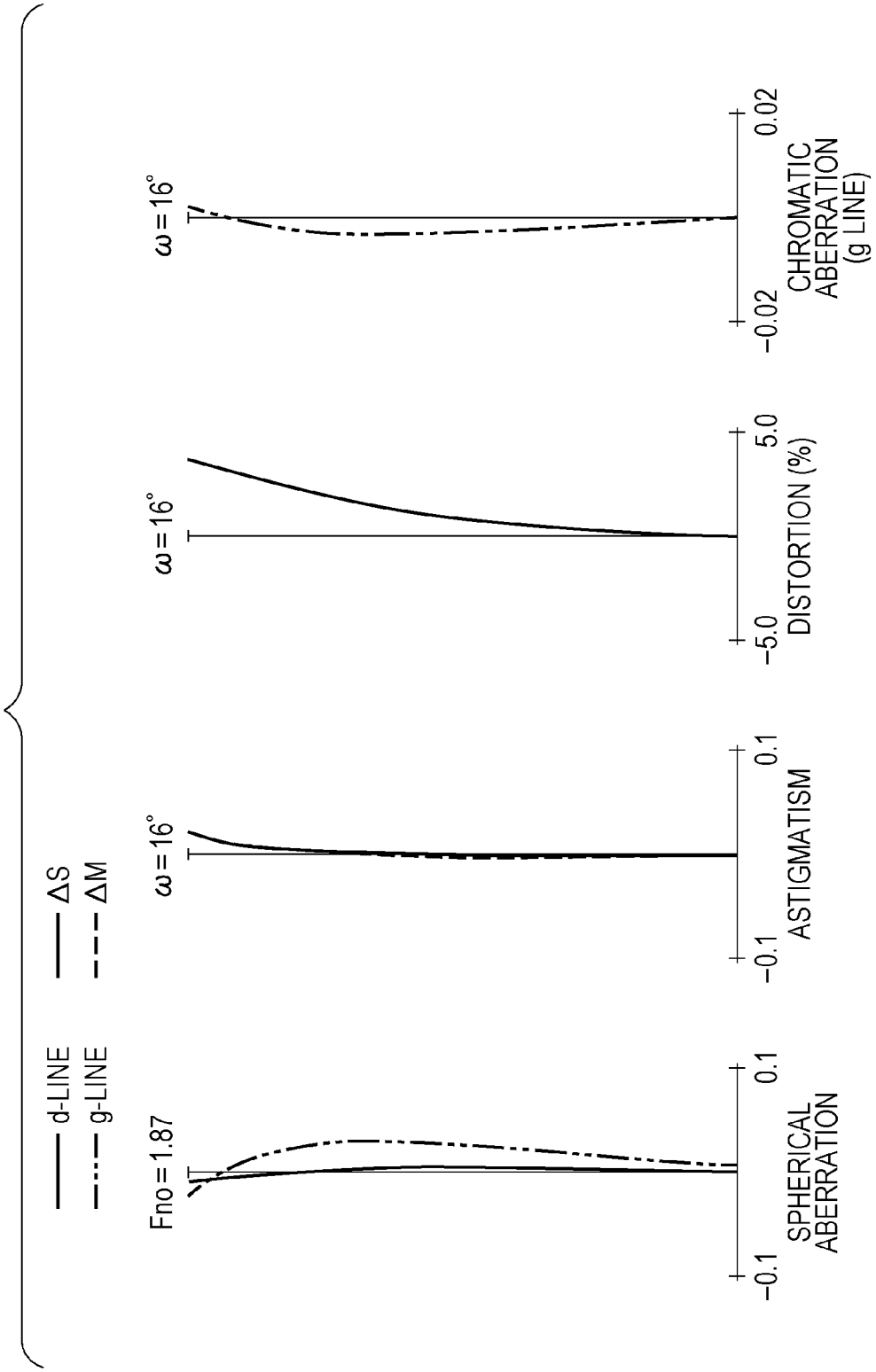

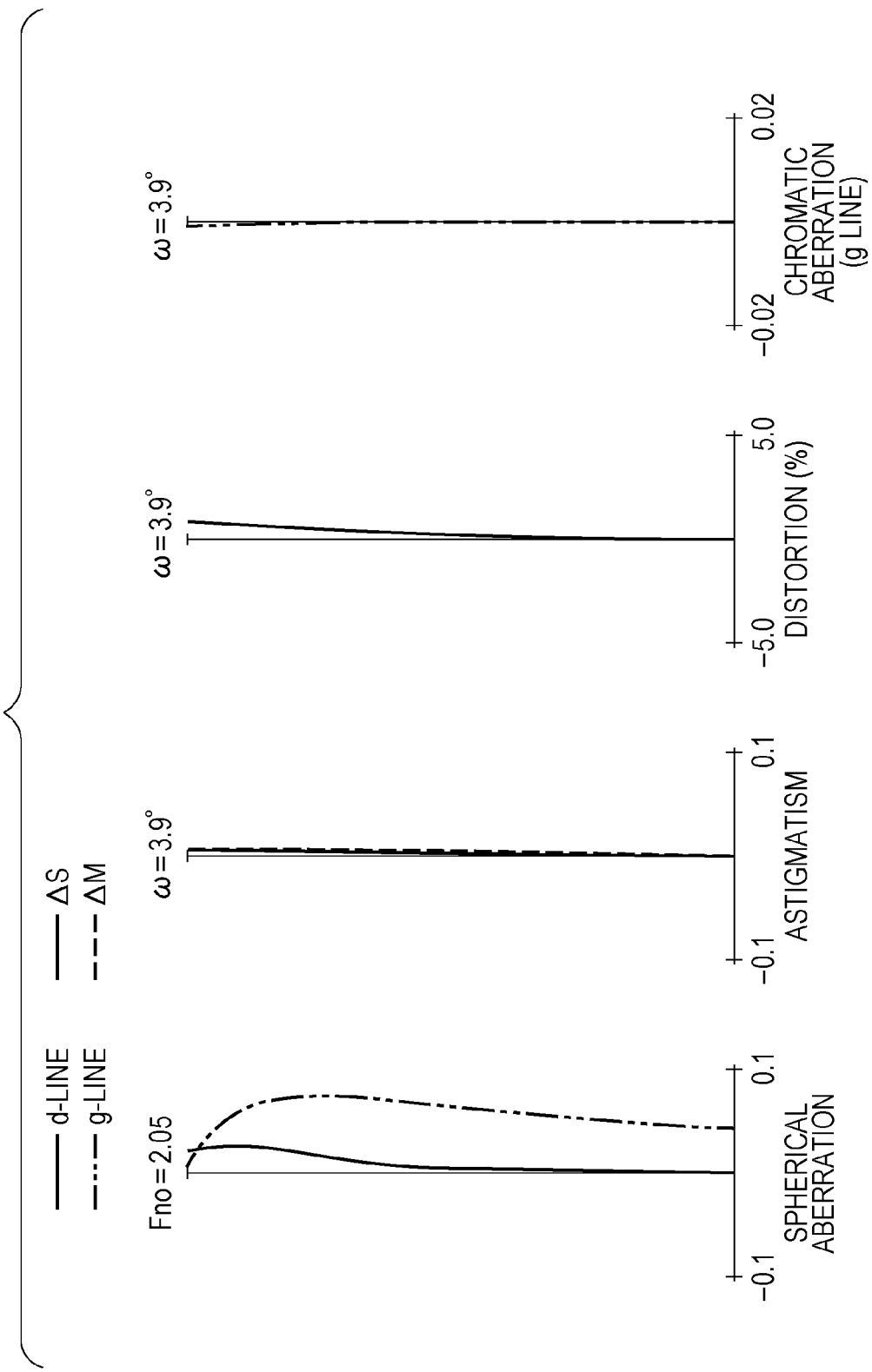

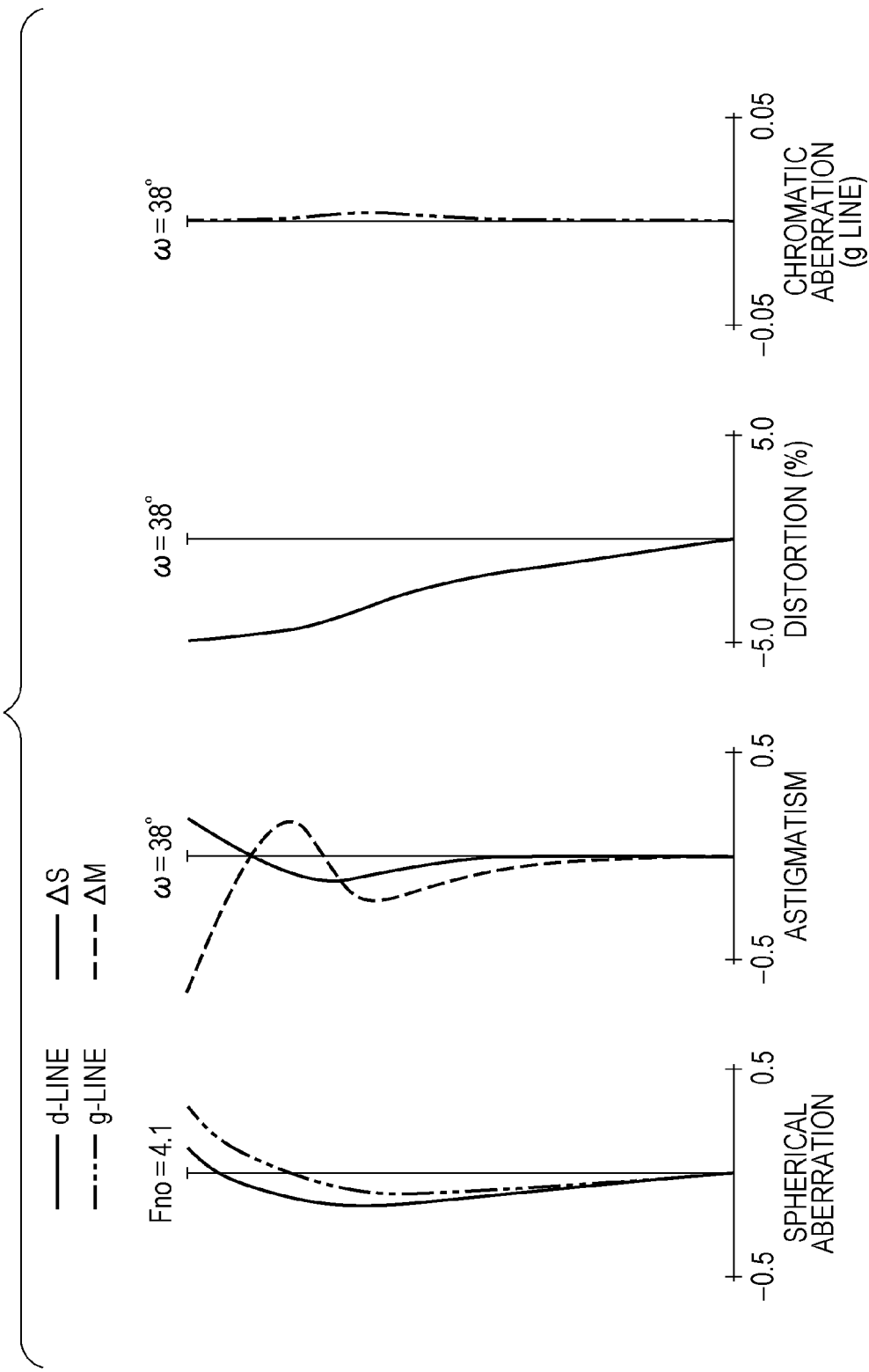

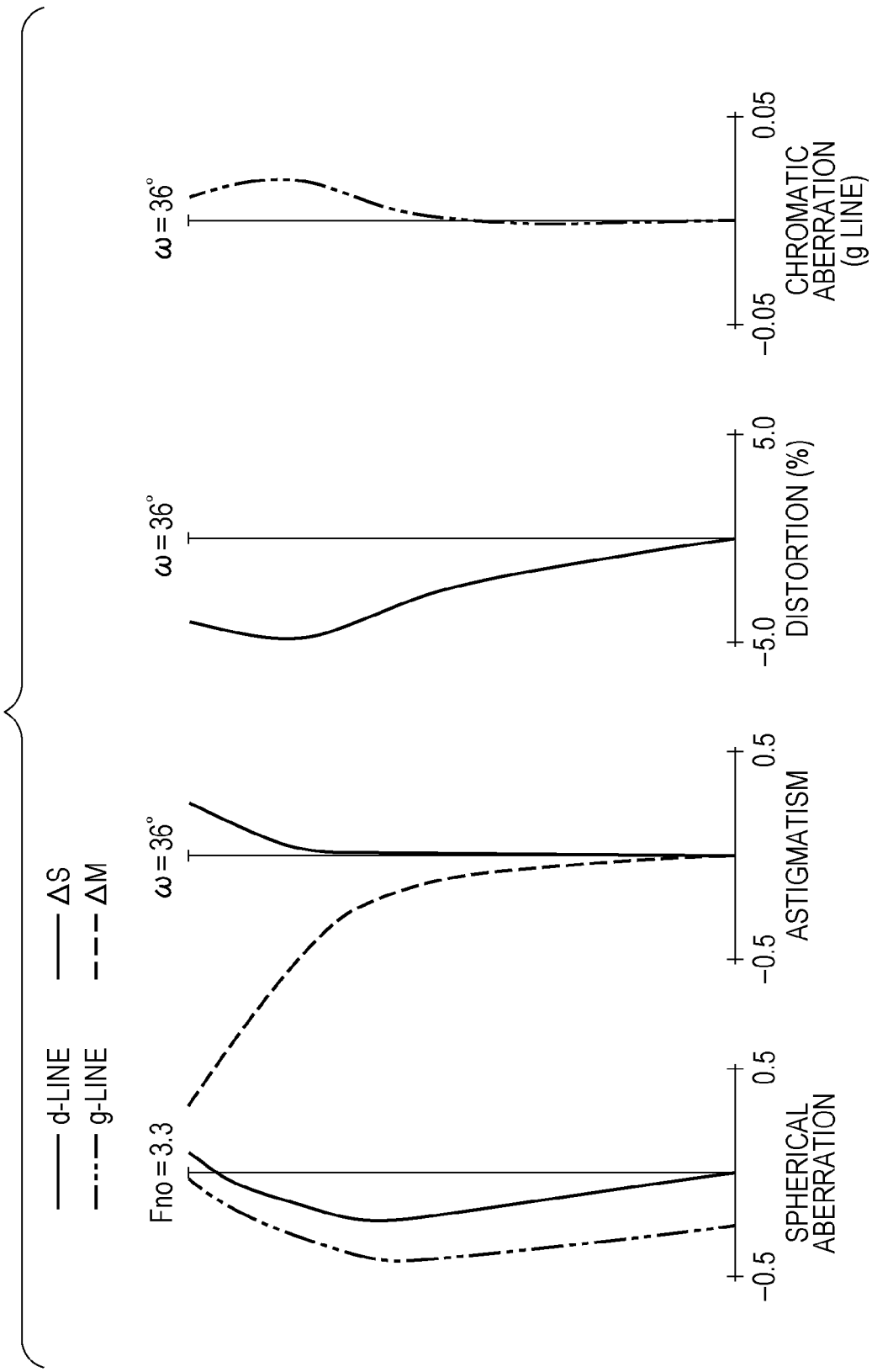

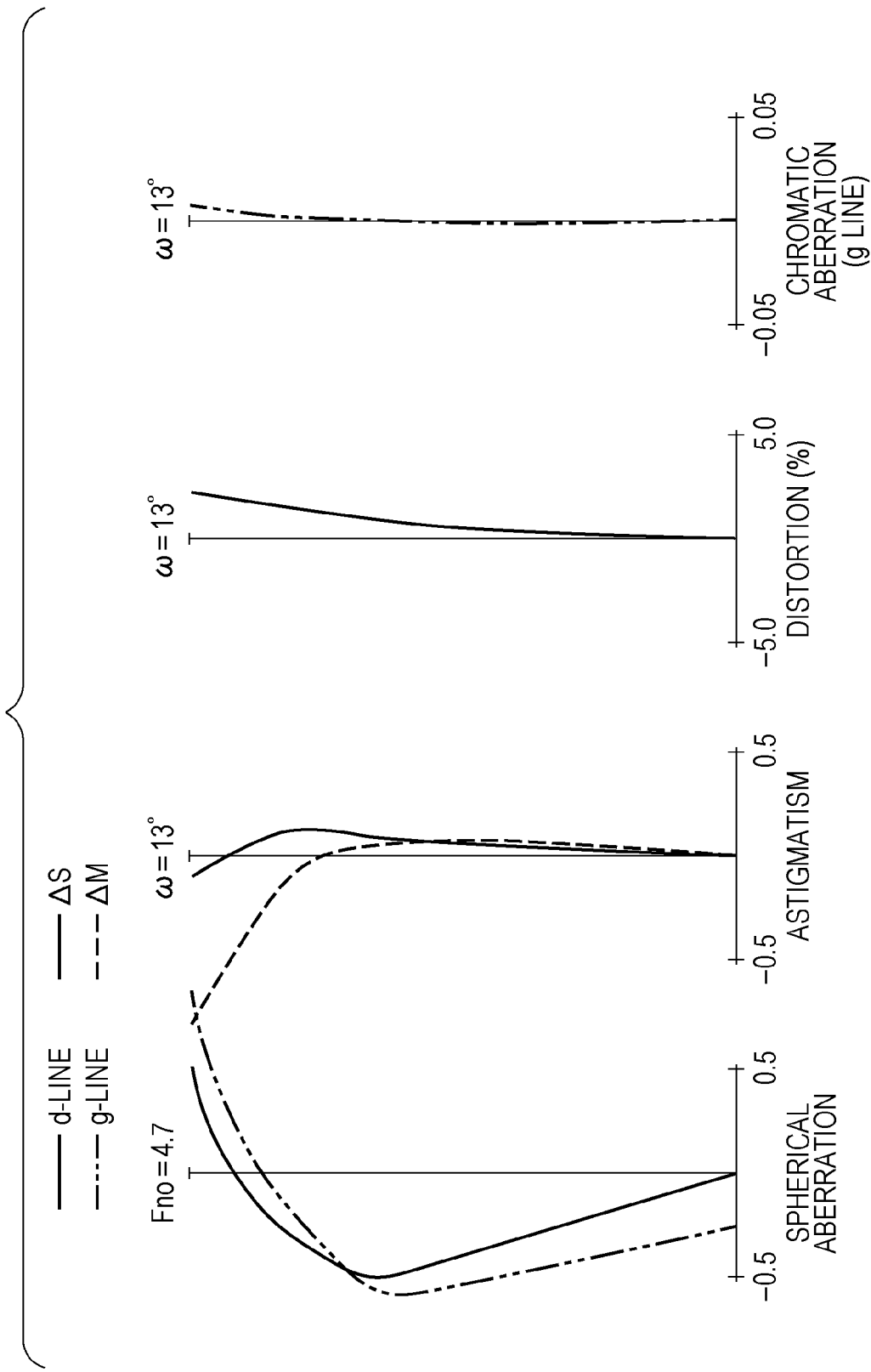

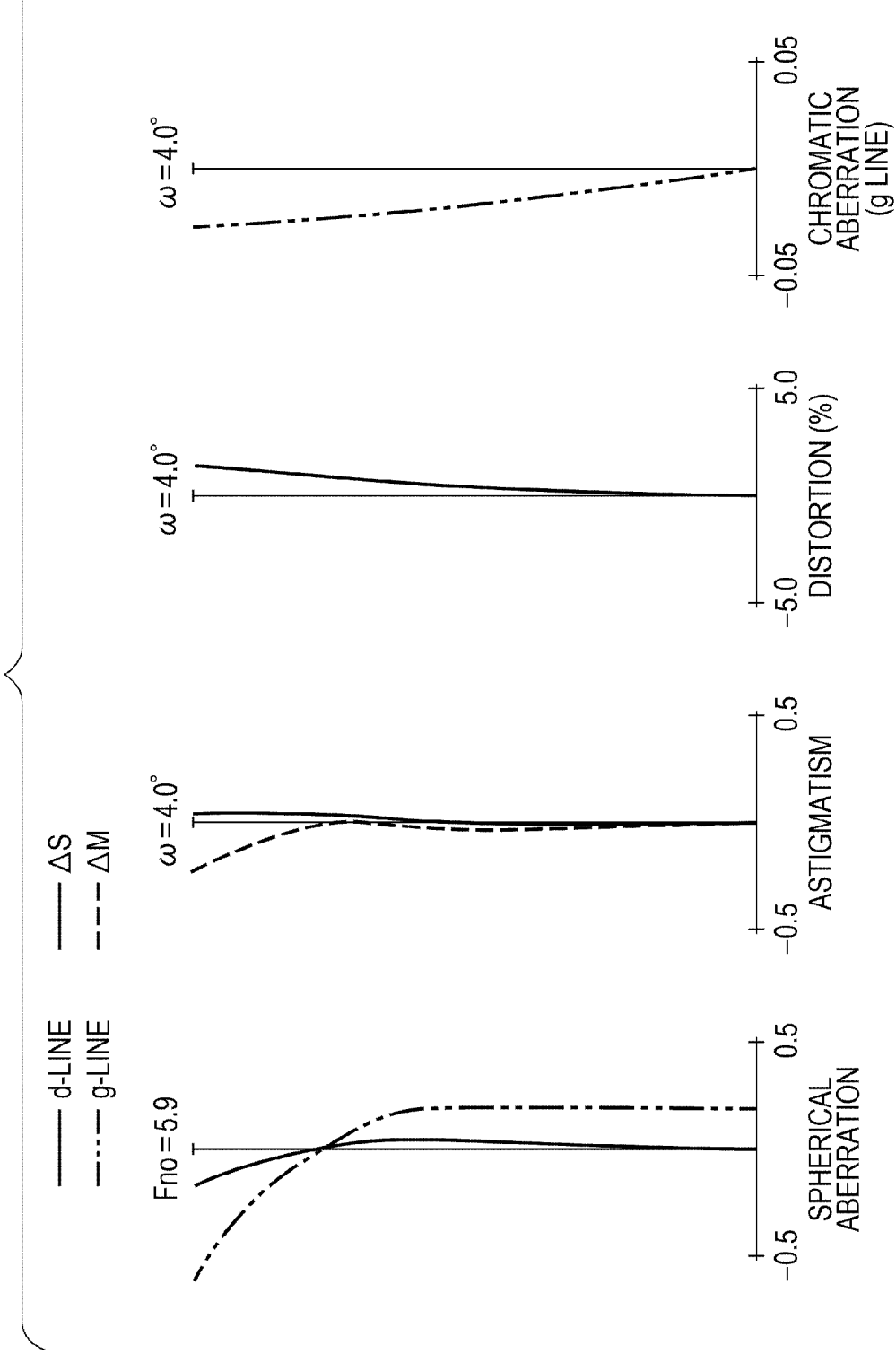

ZOOM LENS AND IMAGE PICKUP APPARATUS HAVING THE SAME

BACKGROUND OF THE INVENTION

1. Field of the Invention

The present invention relates to a zoom lens and an image pickup apparatus having the same, and in particular, to a zoom lens and an image pickup apparatus suited to a digital camera, a video camera, a TV camera, a monitoring camera, and a silver-halide film camera.

2. Description of the Related Art

In recent years, an imaging lens used in an image pickup apparatus such as a TV camera, a digital camera, and a video camera is required to be a zoom lens having high optical performance over the entire zoom range. Also, the imaging lens is desired to have a high zoom ratio to enlarge an imaging area. To obtain high optical performance over the entire zoom range, it is important to appropriately correct chromatic aberration in addition to correcting monochromatic aberrations such as spherical aberration and coma aberration.

In particular, for a zoom lens whose focal length on the telephoto side is long and which has a high zoom ratio, it is important to appropriately correct secondary spectrum as correction of chromatic aberration in addition to primary achromatism. As a zoom lens having a high zoom ratio, a so-called positive lead type zoom lens is known in which a lens unit having a positive refractive power is disposed nearest to the object. As a positive lead type zoom lens, a zoom lens is known in which an anomalous dispersion material is used as a material of lenses of the first lens unit and the chromatic aberration (secondary spectrum) is appropriately corrected (U.S. Pat. No. 6,594,087).

Also, a zoom lens is known in which lenses formed of an anomalous dispersion material are used in the first lens unit in a zoom lens made up of five lens units respectively having positive, negative, positive, negative, and positive refractive powers in order from the object side (U.S. Pat. No. 7,304,805).

Also, a zoom lens is known in which the chromatic aberration is corrected by using lenses formed of a material of low dispersion having a high partial dispersion ratio in the second lens unit in a zoom lens made up of five lens units respectively having positive, negative, positive, negative, and positive refractive powers in order from the object side (U.S. Pat. No. 7,177,092).

On the other hand, a zoom lens is known in which lenses formed of a material of high dispersion having a high partial dispersion ratio are used in the second lens unit in a negative lead type zoom lens made up of a first to a third lens units respectively having negative, positive, and positive refractive powers in order from the object side (Japanese Patent Laid-Open No. 2008-233161).

It is relatively easy to realize a high zoom ratio by using a positive lead type zoom lens. However, the secondary spectrum of axial chromatic aberration tends to be large in a zoom area on the telephoto side. In a positive lead type zoom lens, to obtain high optical performance over the entire zoom range even when the zoom lens has a high zoom ratio, it is important to reduce chromatic aberration, in particular, to reduce the secondary spectrum in addition to the primary chromatic aberration.

To reduce the primary chromatic aberration and the secondary spectrum, it is effective to use a lens formed of a material of low dispersion having anomalous dispersion property in an appropriate position in a zoom lens. Regarding the chromatic aberration, it is important to optimize refractive powers of the lens units including lenses formed of materials described above on the basis of material characteristics (Abbe number and partial dispersion ratio). For example, in a zoom lens having a high zoom ratio, the chromatic aberration of magnification on the wide-angle side and the chromatic aberration of magnification on the telephoto side tend to be generated in the opposite directions. In this case, it is desirable that a lens formed of a lens material having an excellent effect for correcting the chromatic aberration is disposed in the second lens unit where the incidence height of the principal ray largely varies.

For example, in the positive lead type zoom lens described above, it is important to appropriately set materials of lenses included in the first lens unit having a positive refractive power and the second lens unit having a negative refractive power, and if the materials of these lenses are inappropriate, it is difficult to reduce the secondary chromatic aberration of magnification. As a result, it is difficult to obtain high optical performance over the entire zoom range.

The present invention provides a zoom lens of positive lead type, in which the secondary chromatic aberration of magnification can be reduced and high optical performance can be obtained over the entire zoom range while achieving a high zoom ratio, and an image pickup apparatus having the zoom lens.

SUMMARY OF THE INVENTION

A zoom lens of the present invention includes, in order from the object side to the image side, a first lens unit having a positive refractive power, a second lens unit having a negative refractive power, and a rear group including one or more lens units. An aperture stop is included on the image side of the second lens unit, and the second lens unit and at least one of the lens units included in the rear group move during zooming. When the Abbe number and the partial dispersion ratio of a material of a refractive optical element j1 having a negative refractive power included in the second lens unit are defined as vdj1 and θgFj1 respectively, the focal length of the refractive optical element j1 is defined as fj1, the focal length of the second lens unit is defined as f2, and the anomalous partial dispersion ratio ΔθgFj1 of the refractive optical element j1 is calculated as ΔθgFj1=θgFj1−(−0.001682vdj1+0.6438), the conditional expressions below are satisfied:

$$0 < \theta gFj1 - (-1.7 \times 10^{-7} \times vdj1^3 + 5.3 \times 10^{-5} \times vdj1^2 - 5.7 \times 10^{-3} \times vvdj1 + 0.76) < 0.4,$$

and $$0.5 \times 10^{-3} < \Delta\theta gFj1/vdj1 \times f2/fj1 < 2.0 \times 10^{-3}.$$

Further features of the present invention will become apparent from the following description of exemplary embodiments with reference to the attached drawings.

BRIEF DESCRIPTION OF THE DRAWINGS

FIG. 1 is a lens cross-sectional view of the wide-angle end of a zoom lens of a first embodiment.

FIGS. 2A, 2B, and 2C are aberration diagrams at the wide-angle end, the intermediate zoom position, and the telephoto end of the first embodiment.

FIGS. 4A, 4B, and 4C are aberration diagrams at the wide-angle end, the intermediate zoom position, and the telephoto end of the second embodiment.

FIGS. 6A, 6B, and 6C are aberration diagrams at the wide-angle end, the intermediate zoom position, and the telephoto end of the third embodiment.

FIGS. 8A, 8B, and 8C are aberration diagrams at the wide-angle end, the intermediate zoom position, and the telephoto end of the fourth embodiment.

FIGS. 10A, 10B, and 10C are aberration diagrams at the wide-angle end, the intermediate zoom position, and the telephoto end of the fifth embodiment.

DESCRIPTION OF THE EMBODIMENTS

Hereinafter, preferred embodiments of the present invention will be described with reference to the attached drawings. A zoom lens of the present invention includes a first lens unit having a positive refractive power (optical power=reciprocal number of focal length), a second lens unit having a negative refractive power, and a rear group including one or more lens units in order from an object side to an image side. The zoom lens has an aperture stop on the image side of the second lens unit. When zooming is performed, the second lens unit and at least one of the lens units in the rear group move.

Figure 3:
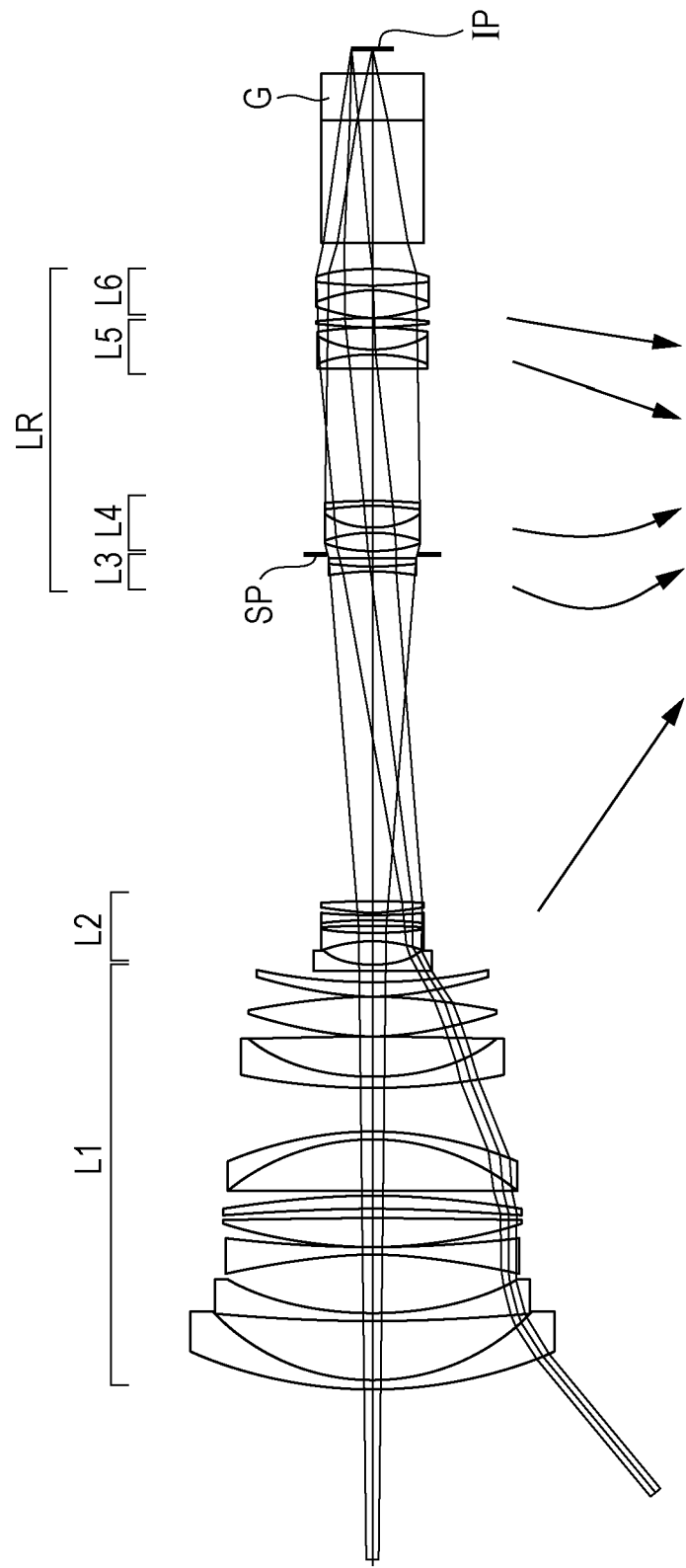
FIG. 3 is a lens cross-sectional view of the wide-angle end of a zoom lens of a second embodiment.
Figure 5:
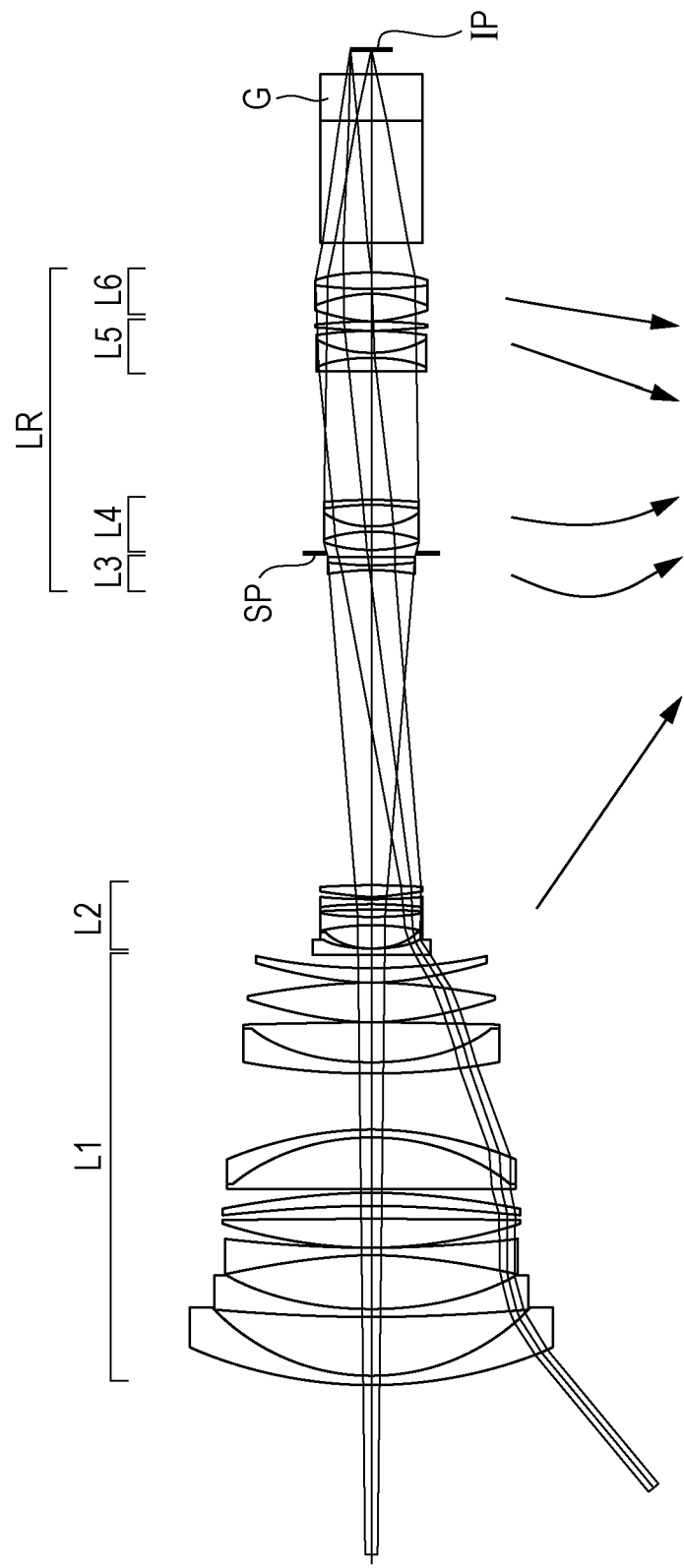
FIG. 5 is a lens cross-sectional view of the wide-angle end of a zoom lens of a third embodiment.

FIG. 1 is a lens cross-sectional view at the wide-angle end (short focal length end) of a zoom lens of a first embodiment of the present invention. FIGS. 2A, 2B, and 2C are aberration diagrams at the wide-angle end, the intermediate zoom position, and the telephoto end (long focal length end) of the zoom lens of the first embodiment, respectively. FIG. 3 is a lens cross-sectional view at the wide-angle end of a zoom lens of a second embodiment of the present invention. FIGS. 4A, 4B, and 4C are aberration diagrams at the wide-angle end, the intermediate zoom position, and the telephoto end of the zoom lens of the second embodiment, respectively. FIG. 5 is a lens cross-sectional view at the wide-angle end of a zoom lens of a third embodiment of the present invention. FIGS. 6A, 6B, and 6C are aberration diagrams at the wide-angle end, the intermediate zoom position, and the telephoto end of the zoom lens of the third embodiment, respectively.

Figure 7:
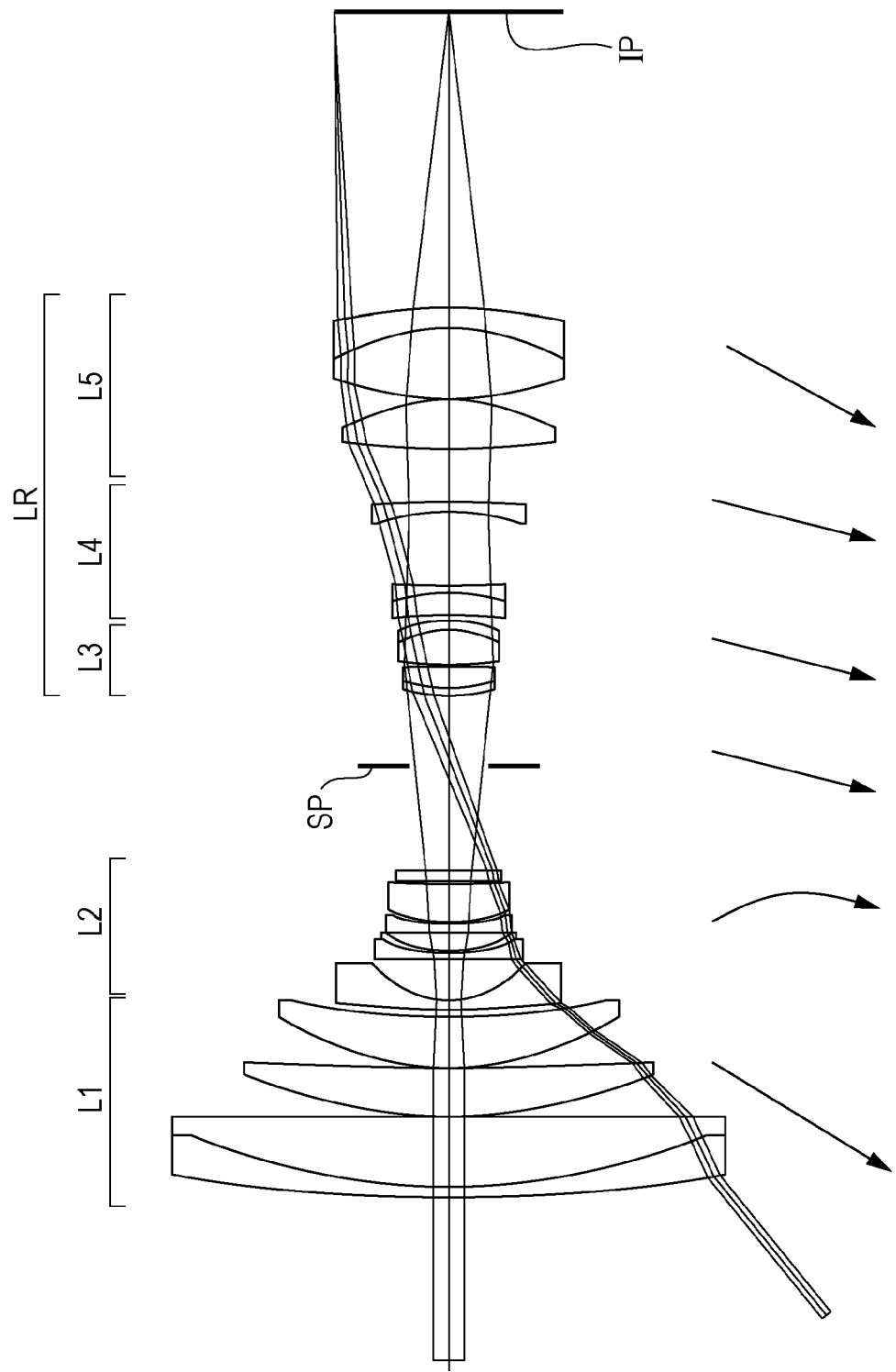
FIG. 7 is a lens cross-sectional view of the wide-angle end of a zoom lens of a fourth embodiment.
Figure 8B:
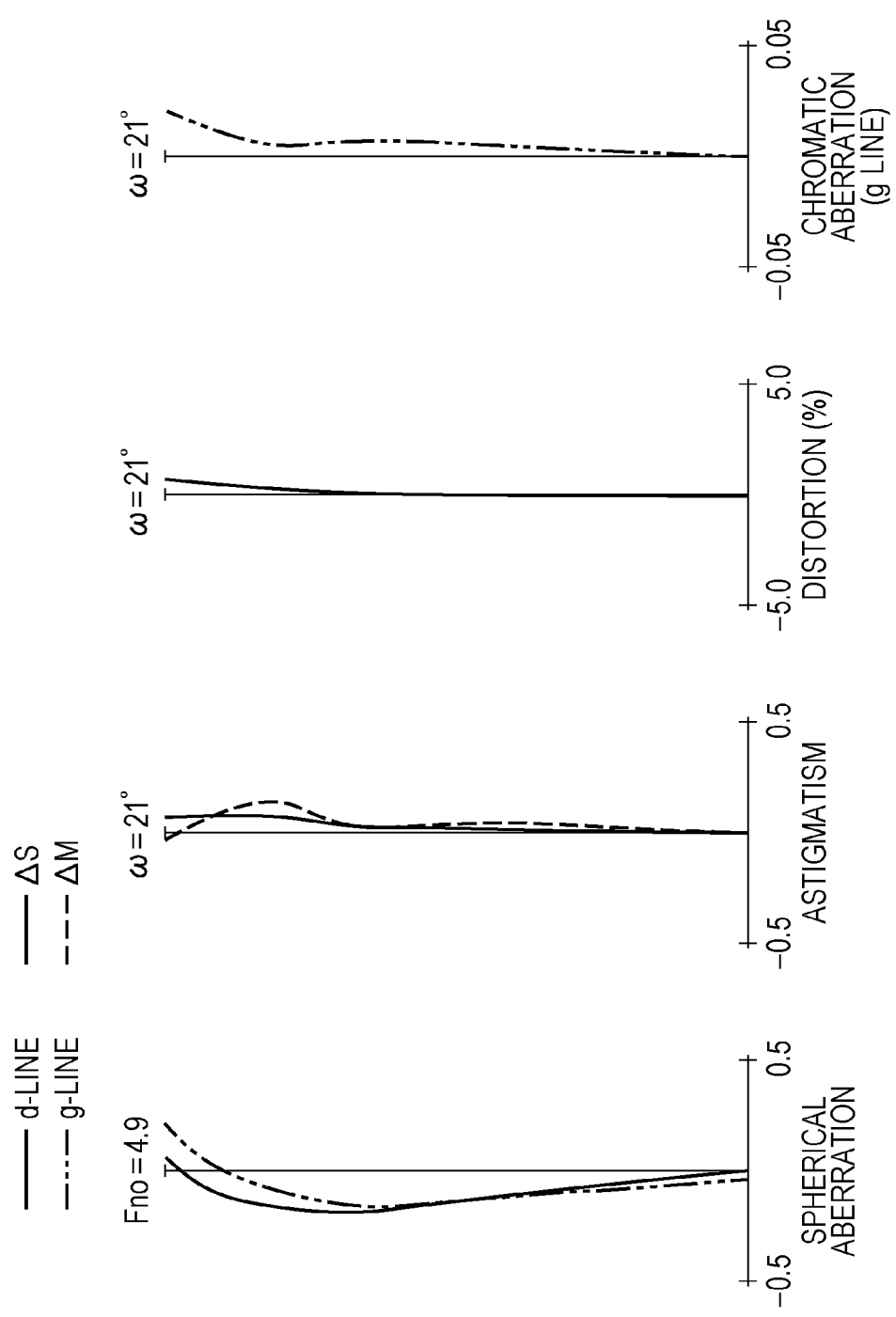
Figure 8C:
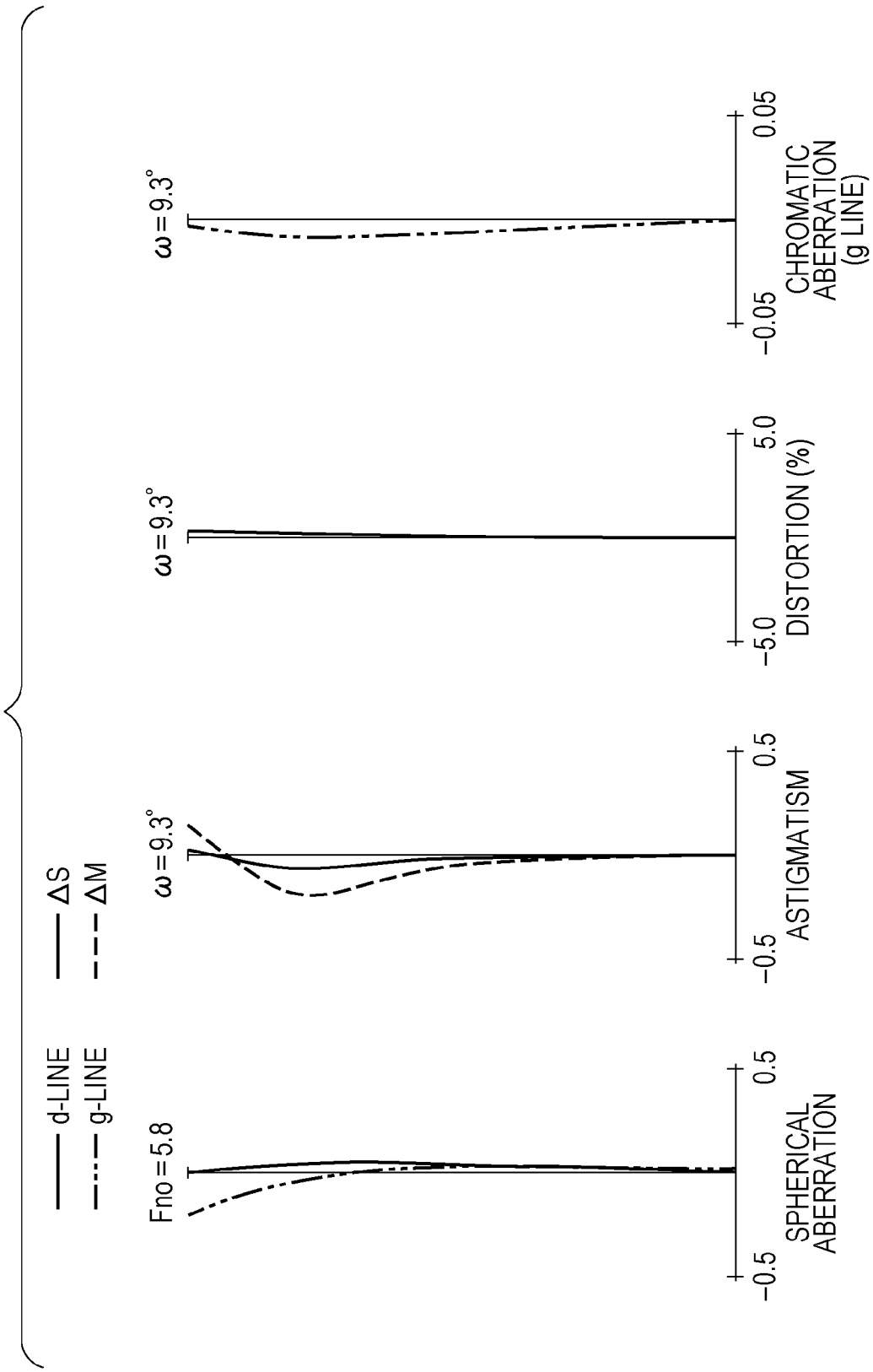
Figure 9:
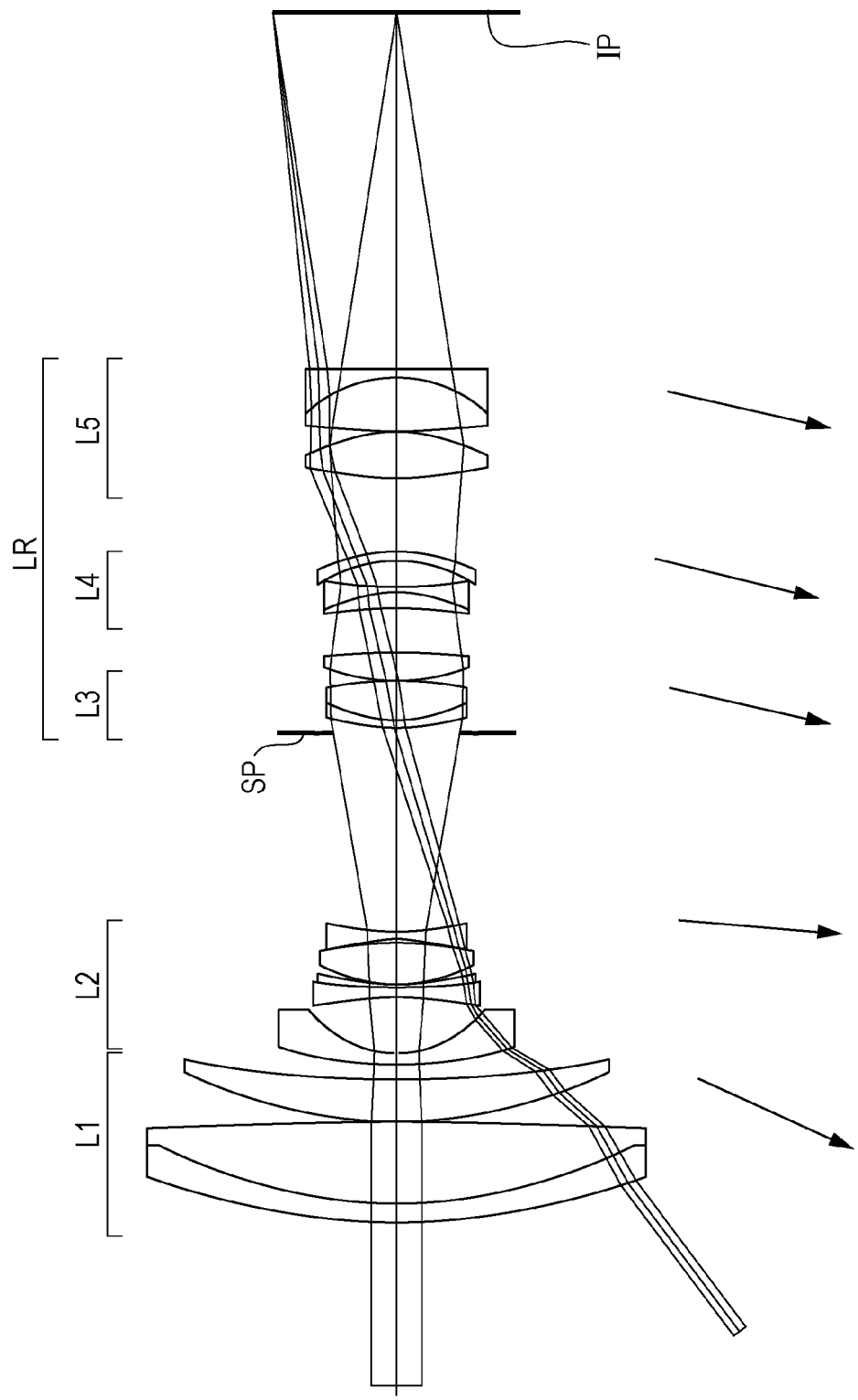
FIG. 9 is a lens cross-sectional view of the wide-angle end of a zoom lens of a fifth embodiment.
Figure 11:
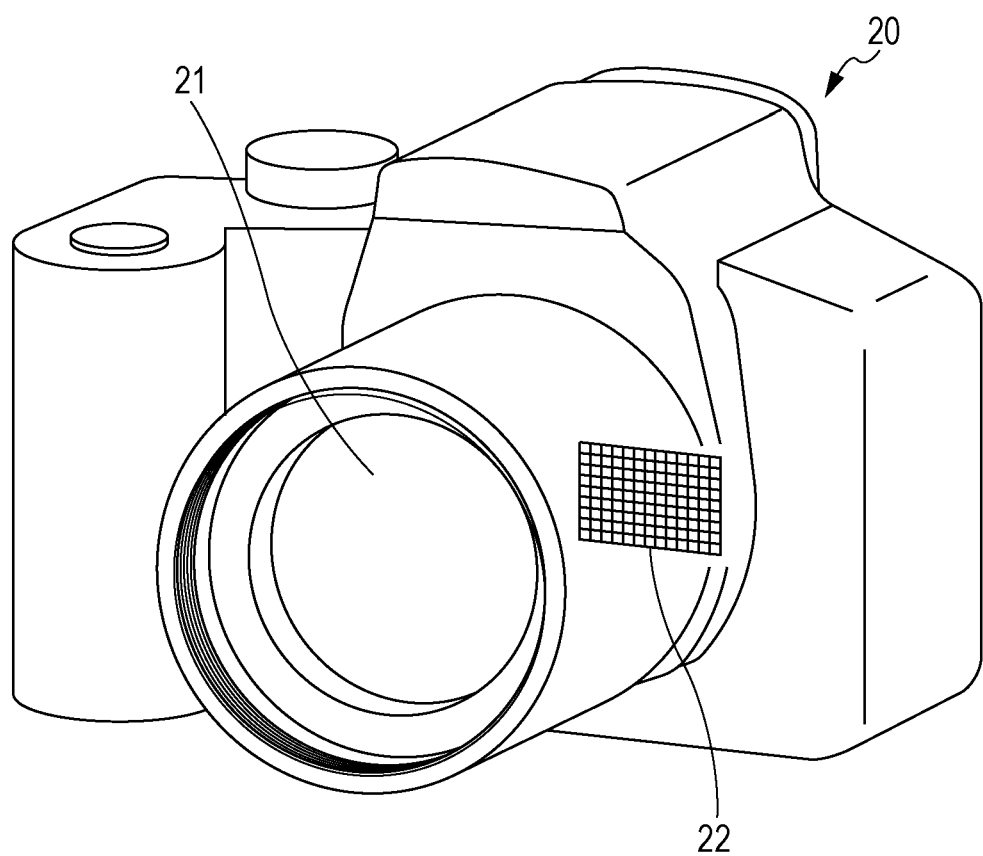
FIG. 11 is a schematic diagram of an essential part of an image pickup apparatus of the present invention.

FIG. 7 is a lens cross-sectional view at the wide-angle end of a zoom lens of a fourth embodiment of the present invention. FIGS. 8A, 8B, and 8C are aberration diagrams at the wide-angle end, the intermediate zoom position, and the telephoto end of the zoom lens of the fourth embodiment, respectively. FIG. 9 is a lens cross-sectional view at the wide-angle end of a zoom lens of a fifth embodiment of the present invention. FIGS. 10A, 10B, and 10C are aberration diagrams at the wide-angle end, the intermediate zoom position, and the telephoto end of the zoom lens of the fifth embodiment, respectively. FIG. 11 is a schematic diagram of an essential part of a digital still camera (image pickup apparatus) including a zoom lens of the present invention.

The zoom lenses of the embodiments are an image taking optical system used in an image pickup apparatus such as a video camera, a digital still camera, a silver-halide film camera, and a TV camera. The zoom lenses of the embodiments can be used as an optical projecting unit for a projection apparatus (projector). In the lens cross-sectional views, the left side is the object side (front) and the right side is the image side (rear). When i is defined as the serial number of a lens unit counted from the object side, Li indicates the ith lens unit. LR indicates the rear group including one or more lens unit.

SP indicates the aperture stop. G indicates an optical block such as an optical filter, a face plate, an optical low-pass filter, and an infrared cut filter. IP indicates the image plane. The image plane corresponds to the image pickup area of a solid-state image pickup element (photoelectric conversion element) such as a CCD sensor and a CMOS sensor when the zoom lens is used as an image taking optical system of a video camera or a digital camera. When the zoom lens is used as an image taking optical system of a silver-halide film camera, the image plane corresponds to the film surface. The arrows indicate loci of the moving lens units when zooming is performed from the wide-angle end to the telephoto end.

In a spherical aberration diagram, the solid line indicates the d line (wavelength is 587.6 nm) and the two-dot chain line indicates the g line (wavelength is 435.8 nm). In an astigmatism diagram, the solid line and the dashed line are the sagittal image plane and the meridional image plane on the d line. The distortion is shown for the d line. In a diagram of chromatic aberration of magnification, the two-dot chain line indicates the g line. Fno is the F-number and ω is the half angle of view. In the embodiments below, the wide-angle end and the telephoto end are zoom positions when the zoom lens units are located at both ends of a range in which the zooming lens units can mechanically move on the optical axis.

Each of the embodiments is a zoom lens including a first lens unit L1 having a positive refractive power, a second lens unit L2 having a negative refractive power, and a rear group LR, which includes one or more lens units and has a positive refractive power as a whole, in order from the object side to the image side. In the first to the third embodiments, the rear group LR includes, in order from the object side to the image side, a third lens unit L3 having a negative refractive power, a fourth lens unit L4 having a positive refractive power, a fifth lens unit L5 having a positive refractive power, and a sixth lens unit L6 having a positive refractive power. When zooming is performed, the third lens unit L3 to the sixth lens unit L6 move.

In the fourth and the fifth embodiments, the rear group LR includes, in order from the object side to the image side, a third lens unit L3 having a positive refractive power, a fourth lens unit L4 having a negative refractive power, and a fifth lens unit L5 having a positive refractive power, and when zooming is performed, the third lens unit L3 to the fifth lens unit L5 move. The aperture stop SP is disposed on the image side of the second lens unit L2 and moves during zooming.

A positive lead type zoom lens, which is suited to achieve a high zoom ratio, becomes a retro-focus type lens on the wide-angle side and becomes a telephoto type lens at the telephoto end. In a configuration of a retro-focus type lens, the incidence height of the paraxial chief ray of a positive lens element formed of a material of high dispersion having a high partial dispersion ratio θgF and a negative lens element formed of a material of low dispersion having a low partial dispersion ratio θgF disposed on the object side of the aperture stop SP is high. Therefore, in a state in which the primary chromatic aberration correction is achieved, a bouncing effect of light beam is strong in a short wavelength region, so that the secondary chromatic aberration of magnification is too much corrected.

In a configuration of a telephoto type lens, the incidence height of the paraxial chief ray of a positive lens element formed of a material of low dispersion having a low partial dispersion ratio θgF and a negative lens element formed of a material of high dispersion having a high partial dispersion ratio θgF disposed on the object side of the aperture stop SP is high. Therefore, in a state in which the primary chromatic aberration correction is achieved, a press down effect of light beam is strong in a short wavelength region, so that the secondary chromatic aberration of magnification is not sufficiently corrected. Thereby, in the positive lead type zoom lens, the secondary chromatic aberration of magnification tends to be too much corrected at the wide-angle end and tends to be insufficiently corrected at the telephoto end. In this case, it is desirable that a negative lens formed of a material having a high partial dispersion ratio θgF should be used in the second lens unit L2 where the incidence height of the paraxial chief ray largely varies.

The incidence height of the paraxial chief ray is high at the wide-angle end of the second lens unit L2, so that the second lens unit L2 largely affects the chromatic aberration of magnification. At this time, the secondary chromatic aberration of magnification, which is too much corrected, can be corrected by the effect of an anomalous partial dispersion material having a high refractive index on the short wavelength side.

On the other hand, the incidence height of the paraxial chief ray is low at the telephoto end, so that the second lens unit L2 does not so much affect the chromatic aberration of magnification. Therefore, the effect of an anomalous partial dispersion material is small, so that it is not so often that the secondary chromatic aberration of magnification is further insufficiently corrected. By the mechanism as described above, the secondary chromatic aberration of magnification is well corrected over the entire zoom area. For example, in a negative lead type imaging optical system in Japanese Patent Laid-Open No. 2008-233161, an example is described in which a positive lens formed of a material of high dispersion having a high partial dispersion ratio θgF is used in the second lens unit L2.

When a material of high dispersion is used for a positive lens, a lens configuration advantageous for correcting the primary chromatic aberration is obtained. However, the partial dispersion ratio θgF of the material of the positive lens is high, so that the chromatic aberration of magnification is too much corrected at the wide-angle end by the mechanism described above. In a positive lead type zoom optical system in U.S. Pat. No. 7,177,092, an example is described in which a negative lens formed of a material of low dispersion having a high partial dispersion ratio θgF is used in the second lens unit L2. However, a material of low dispersion has a low refractive index. Therefore, when a material of low dispersion is used, a curvature of field degrades, so that it is difficult to obtain high performance.

When using a lens configuration in which a material having a high refractive index and a high partial dispersion ratio is used for a negative lens, it is possible to improve the chromatic aberration while suppressing the degradation of the curvature of field. However, a material having a high refractive index and a high partial dispersion ratio θgF has high dispersion. Therefore, in the lens configuration described above, the primary chromatic aberration degrades. To correct the primary color correction, a material of high dispersion having a high partial dispersion ratio θgF is required to be used for a positive lens combined in the second lens unit. Thereby, as a result, the secondary chromatic aberration of magnification is too much corrected on the wide-angle side, so that it is difficult to correct the primary and the secondary color corrections in a balanced manner when using the material used in the imaging optical system in Japanese Patent Laid-Open No. 2008-233161.

On the other hand, the zoom lenses of the embodiments are configured as described below. The Abbe number and the partial dispersion ratio of a material of a refractive optical element j1 having a negative refractive power included in the second lens unit L2 are defined as $vdj1$ and $\theta gFj1$ respectively. The focal length of the refractive optical element j1 is defined as $fj1$. The focal length of the second lens unit is defined as $f2$. The anomalous partial dispersion ratio $\Delta\theta gFj1$ of the refractive optical element j1 is calculated as follows:

$$\Delta\theta gFj1 = \theta gFj1 - (-0.001682 vdj1 + 0.6438).$$

At this time, the conditions described below are satisfied.

$$0 < \theta gFj1 - (-1.7 \times 10^{-7} \times vdj1^3 + 5.3 \times 10^{-5} \times vdj1^2 - 5.7 \times 10^{-3} \times vvdj1 + 0.76) < 0.4 \quad (1)$$

$$0.5 \times 10^{-3} < \Delta\theta gFj1 / vdj1 \times f2/fj1 < 2.0 \times 10^{-3} \quad (2)$$

When the refraction indices of the d line, F line, C line, and g line of the Fraunhofer lines are defined as Nd, NF, NC, and Ng respectively, the Abbe number νd and the partial dispersion ratio θgF of the material are defined as follows:

$$vd = (Nd-1)/(NF-NC)$$

$$\theta gF = (Ng-NF)/(NF-NC).$$

Therefore, in each embodiment, a material having a high partial dispersion ratio θgF which satisfies the conditional expression (1) is used. Thereby, the effect of correcting the secondary chromatic aberration is larger than the effect of degrading the primary chromatic aberration. Even when a material of high dispersion having a high partial dispersion ratio θgF is used for the primary achromatism, if the partial dispersion ratio θgF of the material of the negative lens is sufficiently large, the secondary chromatic aberration can be small.

The conditional expressions (1) and (2) are set in view of the above reason, and material characteristics and an appropriate refractive power necessary for the refractive optical element are set by the conditional expressions. When the value of the conditional expression (1) is smaller than the lower limit thereof, the secondary achromatizing capability degrades and the performance degradation of the optical system increases due to the secondary chromatic aberration. When the refractive optical elements are used in a range lower than the lower limit of the conditional expression (2), a sufficient effect of the optical elements cannot be obtained. When the refractive optical elements are used in a range higher than the upper limit of the conditional expression (2), the secondary chromatic aberration is too much corrected. In this case, it is difficult to correct both the primary chromatic aberration and the secondary chromatic aberration, so this is undesirable. The conditional expressions (1) and (2) are more preferably set as follows:

$$0.05 < \theta gFj1 - (-1.7 \times 10^{-7} \times vdj1^3 + 5.3 \times 10^{-2} - 5.7 \times 10^{-3} \times vdj1 + 0.76) < 0.3 \quad (1a)$$

$$0.6 \times 10^{-3} < \Delta\theta gFj1 / vdj1 \times f2/fj1 < 1.9 \times 10^{-3} \quad (2a)$$

When the above conditions are satisfied, it is possible to more easily correct the variation of the secondary chromatic aberration over the entire zoom area. In each embodiment, it is further preferable that one or more conditions described below are satisfied.

The Abbe number and the partial dispersion ratio of a material of a refractive optical element j2 having a positive refractive power included in the first lens unit L1 are defined as $vdj2$ and $\theta gFj2$ respectively, and the focal length of the refractive optical element j2 is defined as $fj2$. The Abbe number of a refractive optical element j3 having a negative refractive power included in the second lens unit L2 is defined as $vdj3$, and the focal length of the refractive optical element j3 is defined as fj3. At this time, it is desired that at least one of the conditional equations described below are satisfied.

$$65 < \nu dj2 < 100 \quad (3)$$

$$0 < \theta gFj2 - (-1.6 \times 10^{-3} \times \nu dj2 + 0.64) < 0.4 \quad (4)$$

$$-1.3 < fj2/fj1 < -0.6 \quad (5)$$

$$50 < \nu dj3 < 100 \quad (6)$$

$$0.1 < (fj3/fj1) < 0.4 \quad (7)$$

The conditional expressions (3) to (5) are for improving the optical performance, such as improving the resolving power, by correcting the secondary chromatic aberration on the telephoto side. The first lens unit L1 is suited to correct the chromatic aberration of magnification on the telephoto side because both the incidence height of the paraxial ray and the incidence height of the paraxial chief ray are high. When the refractive optical element j1 having a high partial dispersion ratio is used in the second lens unit L2, the secondary axial chromatic aberration tends to degrades. To suppress the degradation, it is effective to dispose the refractive optical element j2 in the first lens unit L1. If the refractive optical element j2 is disposed in a lens unit on the image side of the aperture stop SP, the correction effect of the chromatic aberration of magnification and the correction effect of the axial chromatic aberration conflict with each other, so that the correction is difficult.

When a material with a dispersion property higher than the value indicated by the conditional equation (3) is used, it is difficult to correct the chromatic aberration on the telephoto side. A material with a dispersion property lower than the value indicated by the conditional equation (3) generally has a low refractive index and other aberrations are difficult to be corrected, so that such a material is not desirable. When a material with a partial dispersion ratio smaller than the value indicated by the conditional equation (4) is used, it is difficult to correct the secondary chromatic aberration on the telephoto side.

Generally, an optical material that satisfies the conditional equations (3) and (4) has a low refractive index. Therefore, if the refractive optical elements are used in a range smaller than the lower limit of the conditional expression (5), in particular, the curvature of field degrades, so this is not good. If the refractive optical elements are used in a range greater than the upper limit of the conditional expression (5), it is difficult to obtain a sufficient correction effect. The conditional expressions (3), (4), and (5) are more preferably set as follows:

$$65 < \nu dj2 < 85 \quad (3a)$$

$$0.01 < \theta gFj2 - (-1.6 \times 10^{-3} \times \nu dj2 + 0.64) < 0.1 \quad (4a)$$

$$-1.8 < fj2/fj1 < -0.5 \quad (5a)$$

The conditional expressions (6) and (7) are for well performing the primary achromatism in the second lens unit L2. When a material with a dispersion property higher than the value indicated by the conditional equation (6) is used, it is difficult to suppress the primary achromatizing capability. A material with a dispersion property lower than the value indicated by the conditional equation (6) generally has a low refractive index and other aberrations are difficult to be corrected, so that such a material is not desirable.

If the refractive optical elements are used in a range greater than the upper limit of the conditional expression (7), it is difficult to suppress the primary achromatizing capability. If the refractive optical elements are used in a range smaller than the lower limit of the conditional expression (7), the refractive power of the refractive optical element j1 weakens and the secondary achromatizing effect reduces, so this is not good. The conditional expressions (6) and (7) are more preferably set as follows:

$$53.0 < \nu dj3 < 85.0 \quad (6a)$$

$$0.10 < (fj3/fj1) < 0.38 \quad (7a)$$

Next, a lens configuration of each embodiment will be described.

First Embodiment

A first embodiment shown in FIG. 1 is a zoom lens including the first to the sixth lens units L1 to L6 having positive, negative, negative, positive, positive, and positive refractive powers respectively in this order from the object side to the image side. The zoom lens has a lens configuration in which a lens unit having a positive refractive power and a lens unit having a negative refractive power are arranged in order from the object side to the image side, so that a high zoom ratio is realized.

In the zoom lens of the present embodiment, when zooming is performed from the wide-angle end to the telephoto end, the second lens unit L2 to the sixth lens unit L6 are moved. The first lens unit L1 does not move when the zooming is performed. Specifically, the second lens unit L2 moves toward the image side. The third lens unit L3 moves along a locus convex toward the object side. The fourth lens unit L4 including the aperture stop SP moves along a locus convex toward the object side. The fifth lens unit L5 moves toward the object side. The sixth lens unit L6 moves toward the object side.

In the present embodiment, all of the third to the sixth lens units in the rear group LR are moved. In the zoom lens of the present embodiment, the refractive optical element j1 that satisfies the conditional equations (1) and (2) is disposed in the second lens unit L2. In the second lens unit L2, the incidence height of the paraxial chief ray lowers when zooming is performed from the wide-angle end to the telephoto end. Therefore, the secondary chromatic aberration of magnification is corrected by disposing a refractive optical element formed of a material having a high partial dispersion ratio in the second lens unit L2 as a negative power (refractive power).

Further, the chromatic aberration is reduced on the telephoto side by disposing the refractive optical element j2 that satisfies the conditional equations (3), (4), and (5) in the first lens unit L1. Further, the variation following the primary zooming is suppressed by disposing the refractive optical element j3 that satisfies the conditional equations (6) and (7) in the second lens unit L2.

Second Embodiment

A second embodiment shown in FIG. 3 is a zoom lens which has a lens configuration similar to that of the first embodiment and includes the first to the sixth lens units L1 to L6 having positive, negative, negative, positive, positive, and positive refractive powers respectively in this order from the object side to the image side. The second embodiment suppresses the variation of the secondary chromatic aberration of magnification caused by the zooming by using the same configuration as that of the first embodiment.

Third Embodiment

A third embodiment shown in FIG. 5 is a zoom lens which has a lens configuration similar to that of the first embodiment and includes the first to the sixth lens units L1 to L6 having positive, negative, negative, positive, positive, and positive refractive powers respectively in this order from the object side to the image side. The third embodiment suppresses the variation of the secondary chromatic aberration of magnification caused by the zooming by using the same configuration as that of the first embodiment.

Fourth Embodiment

A fourth embodiment shown in FIG. 7 is a zoom lens including the first to the fifth lens units L1 to L5 having positive, negative, positive, negative, and positive refractive powers respectively in this order from the object side to the image side. In the zoom lens of the present embodiment, when zooming is performed from the wide-angle end to the telephoto end, the lens units are moved as indicated by the arrows in FIG. 7. The first lens unit L1 moves toward the object side. The second lens unit L2 moves along a locus convex toward the image side. All of the third lens unit L3, the fourth lens unit L4, and the fifth lens unit L5 move toward the object side. The aperture stop SP is located between the second lens unit L2 and the third lens unit L3 and moves toward the object side independently.

In the present embodiment, all of the third to the fifth lens units in the rear group LR are moved. The fourth embodiment suppresses the variation of the secondary chromatic aberration of magnification caused by the zooming by forming the zoom lens so that the conditional equations (1) to (7) are satisfied.

Fifth Embodiment

In the same manner as the fourth embodiment, a fifth embodiment shown in FIG. 9 is a zoom lens including the first to the fifth lens units L1 to L5 having positive, negative, positive, negative, and positive refractive powers respectively in this order from the object side to the image side. In the zoom lens of the present embodiment, when zooming is performed from the wide-angle end to the telephoto end, the lens units are moved as indicated by the arrows in FIG. 9. The first lens unit L1 and the second lens unit L2 moves toward the object side. All of the third lens unit L3 including the aperture stop SP, the fourth lens unit L4, and the fifth lens unit L5 move toward the object side. The fifth embodiment suppresses the variation of the secondary chromatic aberration of magnification caused by the zooming by forming the zoom lens so that the conditional equations (1) to (7) are satisfied.

Next, Table 1 shows specific lenses of the refractive optical element j1 having a negative refractive power in the second lens unit L2, the refractive optical element j2 having a positive refractive power in the first lens unit L1, and the refractive optical element j3 having a negative refractive power in the second lens unit L2 in each embodiment. In Table 1, the refractive optical elements j1, j2, and j3 are indicated by a starting surface number counted from the object side of the numerical examples.

TABLE 1

| Table-1 | Refractive optical element Starting surface number | | |
|---|---|---|---|
| Embodiment | j1 | j2 | j3 |
| 1 | 22 | 11 | 24 |
| 2 | 22 | 19 | 24 |
| 3 | 22 | 15 | 24 |
| 4 | 11 | 2 | 8 |
| 5 | 10 | 2 | 7 |

While the preferred embodiments of the present invention have been described, the present invention is not limited to these embodiments, and various modifications and changes can be made without departing from the scope of the invention.

Hereinafter, specific numerical data of numerical examples 1 to 5 will be described. In each numerical example, i indicates a sequential number counted from the object side, and ri indicates a curvature radius of the ith optical surface (ith surface). The letters di indicate an axial distance between the ith surface and the (i+1)th surface. The letters ndi and vdi respectively indicate the refractive index and the Abbe number of a material of ith (except for lenses (layers) formed of a resin or a fine particle dispersion material) optical member with respect to the d line. The aspherical surface shape is represented by the formula below when X is the amount of displacement from the surface vertex in the optical axis direction, h is the height from the optical axis in a direction perpendicular to the optical axis, r is the paraxial radius of curvature, k is the conic constant, and A4, A6, A8, A10, A12, and so on are respectively the aspherical coefficients of each degree.

$$x(h) = \frac{(1/r)h^2}{1 + \sqrt{\{1 - (1+k)(h/r)^2\}}} + A4h^4 + A6h^6 + A8h^8 + A10h^{10} + A12h^{12} \ldots$$ Formula 1

"e±XX" in each aspherical coefficient means "×10$^{\pm xx}$". The relationship between the conditional expressions and the numerical examples is shown in Table 2. In Table 2, "E-x" means "×10$^{-x}$".

NUMERICAL EXAMPLE 1

| Unit mm | | | | | | |
|---|---|---|---|---|---|---|
| Surface data | | | | | | |
| Surface number | r | d | nd | vd | Effective diameter | θgF |
| 1 | 194.131 | 3.80 | 1.74320 | 49.3 | 145.46 | 0.5530 |
| 2 | 89.363 | 23.97 | | | 126.00 | |
| 3 | 691.989 | 3.30 | 1.69680 | 55.5 | 125.33 | 0.5433 |
| 4 | 143.254 | 23.57 | | | 118.29 | |
| 5 | −227.537 | 3.20 | 1.65160 | 58.5 | 117.40 | 0.5426 |
| 6 | 518.720 | 0.20 | | | 118.00 | |
| 7 | 203.761 | 11.24 | 1.90200 | 25.1 | 119.27 | 0.6117 |
| 8 | −4800.252 | 4.54 | | | 118.93 | |
| 9 | −568.713 | 5.54 | 1.43387 | 95.1 | 118.27 | 0.5373 |
| 10 | −312.827 | 1.90 | | | 117.71 | |
| 11 | 10114.999 | 20.47 | 1.49700 | 81.5 | 114.51 | 0.5374 |
| 12 | −98.221 | 3.60 | 1.73800 | 32.3 | 114.26 | 0.5899 |
| 13 | −147.653 | 18.03 | | | 115.18 | |
| 14 | 316.358 | 3.80 | 1.72342 | 38.0 | 104.03 | 0.5836 |
| 15 | 94.122 | 16.99 | 1.49700 | 81.5 | 99.72 | 0.5374 |
| 16 | −1630.001 | 0.20 | | | 99.38 | |
| 17 | 146.420 | 16.04 | 1.43387 | 95.1 | 97.77 | 0.5373 |
| 18 | −213.896 | 0.20 | | | 97.25 | |
| 19 | 138.660 | 5.52 | 1.59282 | 68.6 | 92.59 | 0.5446 |
| 20 | 245.206 | (Variable) | | | 91.70 | |
| 21* | 793.648 | 2.00 | 1.59282 | 68.6 | 48.06 | 0.5446 |
| 22 | 43.745 | 0.50 | 1.61937 | 19.2 | 41.79 | 0.7478 |
| 23 | 35.432 | 10.04 | | | 40.43 | |
| 24 | −59.368 | 2.00 | 1.59282 | 68.6 | 40.32 | 0.5446 |
| 25 | 112.755 | 3.66 | | | 39.68 | |
| 26 | −131.234 | 2.70 | 1.69895 | 30.1 | 39.71 | 0.6029 |
| 27 | −90.627 | 2.00 | 1.49700 | 81.5 | 40.04 | 0.5374 |
| 28 | 405.838 | 0.20 | | | 40.66 | |

-continued

Unit mm

| | | | | | | |
|---|---|---|---|---|---|---|
| 29 | 98.561 | 4.60 | 1.84666 | 23.8 | 41.12 | 0.6205 |
| 30 | −812.569 | (Variable) | | | 40.98 | |
| 31 | −103.680 | 1.70 | 1.78800 | 47.4 | 34.55 | 0.6029 |
| 32 | 224.901 | 2.90 | 1.84666 | 23.9 | 35.49 | 0.5374 |
| 33 | −1478.278 | (Variable) | | | 35.97 | |
| 34 | ∞ | 1.50 | | | 36.82 | |
| (Aperture) | | | | | | |
| 35* | 81.008 | 7.20 | 1.66672 | 48.3 | 38.33 | |
| 36 | −69.499 | 2.00 | 1.49700 | 81.5 | 38.47 | |
| 37 | 40.073 | 0.55 | | | 38.53 | |
| 38 | 41.126 | 8.73 | 1.49700 | 81.5 | 38.84 | |
| 39 | −105.657 | 1.80 | 1.80400 | 46.6 | 38.87 | |
| 40 | −224.863 | (Variable) | | | 39.08 | |
| 41 | 2657.404 | 5.68 | 1.80809 | 22.8 | 42.92 | |
| 42 | −66.118 | 0.20 | | | 43.13 | |
| 43 | −87.856 | 2.00 | 1.90200 | 25.1 | 42.67 | |
| 44 | 50.774 | 8.93 | 1.49700 | 81.5 | 43.09 | |
| 45 | −120.420 | 0.20 | | | 43.78 | |
| 46 | 251.215 | 3.00 | 1.80809 | 22.8 | 44.76 | |
| 47 | −1608.768 | (Variable) | | | 44.91 | |
| 48 | 65.187 | 11.00 | 1.49700 | 81.5 | 45.55 | |
| 49 | −55.325 | 1.80 | 1.90200 | 25.1 | 45.22 | |
| 50 | 417.556 | 0.20 | | | 45.71 | |
| 51 | 155.828 | 6.69 | 1.80809 | 22.8 | 46.00 | |
| 52 | −91.498 | (Variable) | | | 45.99 | |
| 53 | ∞ | 50.00 | 1.69680 | 55.5 | 39.62 | |
| 54 | ∞ | 19.00 | 1.51633 | 64.1 | 26.31 | |
| 55 | ∞ | 10.08 | | | 20.64 | |
| Image plane | ∞ | | | | | |

Aspheric surface data

21st Surface

K = −2.07284e+003    A4 = 5.75534e−007    A6 = −1.00795e−009
A8 = 3.91571e−013

35th Surface

K = −5.61247e+000    A4 = 3.13222e−007    A6 = −2.37871e−010
A8 = −3.63131e−014

Various data
Zoom ratio 11.50

| | Wide-angle | Intermediate | Telephoto |
|---|---|---|---|
| Focal length | 10.24 | 23.25 | 117.76 |
| F Number | 1.84 | 1.87 | 2.05 |
| Field angle | 37.99 | 18.99 | 3.89 |
| Image height | 8.00 | 8.00 | 8.00 |
| Lens full length | 545.50 | 545.50 | 545.50 |
| BF | 10.08 | 10.08 | 10.08 |
| d20 | 4.89 | 59.09 | 123.71 |
| d30 | 135.54 | 57.04 | 7.24 |
| d33 | 1.98 | 11.70 | 1.96 |
| d40 | 52.63 | 54.51 | 45.42 |
| d47 | 0.53 | 10.14 | 14.61 |
| d52 | 10.93 | 14.04 | 13.57 |
| Incident pupil | 95.64 | 145.78 | 365.78 |
| Exit pupil | 294.51 | 205.14 | 268.35 |
| Front principal point | 106.25 | 171.80 | 537.23 |
| Rear principal point | −0.16 | −13.16 | −107.68 |

Zoom lens group data

| Group | Starting surface | Focal length | Lens length | Front principal point | Rear principal point |
|---|---|---|---|---|---|
| 1 | 1 | 112.19 | 166.12 | 117.84 | 66.95 |
| 2 | 21 | −38.91 | 27.70 | 3.08 | −19.88 |
| 3 | 31 | −148.06 | 4.60 | −0.25 | −2.78 |
| 4 | 34 | 92.07 | 21.78 | 4.03 | −10.75 |
| 5 | 41 | 413.63 | 20.02 | 22.09 | 10.33 |
| 6 | 48 | 84.85 | 19.69 | 6.94 | −5.91 |
| G | 53 | ∞ | 69.00 | 21.00 | −21.00 |

-continued

Unit mm

Single lens data

| Lens | Starting surface | Focal length |
|---|---|---|
| 1 | 1 | −226.30 |
| 2 | 3 | −259.90 |
| 3 | 5 | −242.32 |
| 4 | 7 | 216.93 |
| 5 | 9 | 1592.03 |
| 6 | 11 | 195.86 |
| 7 | 12 | −410.22 |
| 8 | 14 | −186.55 |
| 9 | 15 | 179.63 |
| 10 | 17 | 203.07 |
| 11 | 19 | 528.12 |
| 12 | 21 | −78.17 |
| 13 | 22 | −308.12 |
| 14 | 24 | −65.32 |
| 15 | 26 | 407.88 |
| 16 | 27 | −148.86 |
| 17 | 29 | 104.06 |
| 18 | 31 | −89.85 |
| 19 | 32 | 230.74 |
| 20 | 35 | 57.20 |
| 21 | 36 | −50.83 |
| 22 | 38 | 60.76 |
| 23 | 39 | −249.57 |
| 24 | 41 | 79.91 |
| 25 | 43 | −35.43 |
| 26 | 44 | 73.13 |
| 27 | 46 | 269.08 |
| 28 | 48 | 62.10 |
| 29 | 49 | −54.06 |
| 30 | 51 | 72.21 |

NUMERICAL EXAMPLE 2

Unit mm

Surface data

| Surface number | r | d | nd | vd | Effective diameter | θgF |
|---|---|---|---|---|---|---|
| 1 | 194.411 | 3.80 | 1.74320 | 49.3 | 144.80 | 0.5530 |
| 2 | 89.267 | 23.98 | | | 125.49 | |
| 3 | 706.895 | 3.30 | 1.69680 | 55.5 | 124.72 | 0.5433 |
| 4 | 144.405 | 23.59 | | | 117.81 | |
| 5 | −227.797 | 3.20 | 1.65160 | 58.5 | 116.83 | 0.5426 |
| 6 | 509.567 | 0.20 | | | 117.43 | |
| 7 | 203.922 | 11.28 | 1.90200 | 25.1 | 118.69 | 0.6117 |
| 8 | −4622.150 | 4.44 | | | 118.33 | |
| 9 | −570.929 | 5.54 | 1.43387 | 95.1 | 117.69 | 0.5373 |
| 10 | −312.702 | 1.90 | | | 117.13 | |
| 11 | 10274.349 | 20.39 | 1.49700 | 81.5 | 113.85 | 0.5374 |
| 12 | −98.013 | 3.60 | 1.73800 | 32.3 | 113.57 | 0.5899 |
| 13 | −147.595 | 18.04 | | | 114.50 | |
| 14 | 317.091 | 3.80 | 1.72342 | 38.0 | 103.43 | 0.5836 |
| 15 | 94.216 | 16.86 | 1.49700 | 81.5 | 99.18 | 0.5374 |
| 16 | −1657.865 | 0.20 | | | 98.82 | |
| 17 | 146.199 | 16.09 | 1.43387 | 95.1 | 97.80 | 0.5373 |
| 18 | −214.485 | 0.20 | | | 97.62 | |
| 19 | 139.206 | 5.52 | 1.59282 | 68.6 | 92.96 | 0.5446 |
| 20 | 244.972 | (Variable) | | | 92.07 | |
| 21* | 806.475 | 2.00 | 1.59282 | 68.6 | 47.91 | 0.5446 |
| 22 | 41.000 | 0.50 | 1.619370 | 19.2 | 41.42 | 0.7478 |
| 23 | 35.300 | 10.37 | | | 40.33 | |
| 24 | −59.789 | 2.00 | 1.59282 | 68.6 | 39.96 | 0.5446 |
| 25 | 110.752 | 3.62 | | | 39.33 | |
| 26 | −133.827 | 2.70 | 1.69895 | 30.1 | 39.36 | 0.6029 |

-continued

Unit mm

| | | | | | | |
|---|---|---|---|---|---|---|
| 27 | −102.475 | 2.00 | 1.49700 | 81.5 | 39.73 | 0.5374 |
| 28 | 687.707 | 0.20 | | | 40.31 | |
| 29 | 100.992 | 4.60 | 1.84666 | 23.8 | 40.77 | 0.6205 |
| 30 | −909.118 | (Variable) | | | 40.62 | |
| 31 | −103.943 | 1.70 | 1.78800 | 47.4 | 34.60 | 0.5559 |
| 32 | 241.176 | 2.90 | 1.84666 | 23.9 | 35.53 | 0.6217 |
| 33 | −1088.364 | (Variable) | | | 36.01 | |
| 34 (Aperture) | ∞ | 1.50 | | | 36.94 | |
| 35* | 81.024 | 7.20 | 1.66672 | 48.3 | 38.43 | |
| 36 | −69.433 | 2.00 | 1.49700 | 81.5 | 38.56 | |
| 37 | 39.997 | 0.58 | | | 38.56 | |
| 38 | 41.040 | 8.73 | 1.49700 | 81.5 | 38.88 | |
| 39 | −105.935 | 1.80 | 1.80400 | 46.6 | 38.90 | |
| 40 | −237.888 | (Variable) | | | 39.10 | |
| 41 | 2387.345 | 5.68 | 1.80809 | 22.8 | 42.79 | |
| 42 | −66.200 | 0.20 | | | 43.00 | |
| 43 | −87.020 | 2.00 | 1.90200 | 25.1 | 42.55 | |
| 44 | 51.021 | 8.93 | 1.49700 | 81.5 | 42.97 | |
| 45 | −118.510 | 0.20 | | | 43.68 | |
| 46 | 254.590 | 3.00 | 1.80809 | 22.8 | 44.66 | |
| 47 | −1553.707 | (Variable) | | | 44.82 | |
| 48 | 65.418 | 11.00 | 1.49700 | 81.5 | 45.52 | |
| 49 | −55.197 | 1.80 | 1.90200 | 25.1 | 45.19 | |
| 50 | 421.770 | 0.20 | | | 45.71 | |
| 51 | 154.807 | 6.69 | 1.80809 | 22.8 | 46.02 | |
| 52 | −91.413 | (Variable) | | | 46.01 | |
| 53 | ∞ | 50.00 | 1.69680 | 55.5 | 39.59 | |
| 54 | ∞ | 19.00 | 1.51633 | 64.1 | 26.28 | |
| 55 | ∞ | 9.99 | | | 20.61 | |
| Image plane | ∞ | | | | | |

Aspheric surface data

21st Surface

K = −2.09799e+003  A4 = 5.73584e−007  A6 = −9.60615e−010
A8 = 3.70176e−013

35th Surface

K = −5.53086e+000  A4 = 3.15890e−007  A6 = −2.20906e−010
A8 = −5.55704e−014

Various data
Zoom ratio 11.50

| | Wide-angle | Intermediate | Telephoto |
|---|---|---|---|
| Focal length | 10.26 | 19.14 | 118.00 |
| F Number | 1.84 | 1.87 | 2.05 |
| Field angle | 37.94 | 22.69 | 3.88 |
| Image height | 8.00 | 8.00 | 8.00 |
| Lens full length | 544.21 | 544.21 | 544.21 |
| BF | 9.99 | 9.99 | 9.99 |
| d20 | 5.00 | 48.05 | 124.74 |
| d30 | 134.04 | 70.34 | 3.78 |
| d33 | 2.16 | 10.55 | 3.56 |
| d40 | 51.98 | 53.93 | 45.00 |
| d47 | 1.00 | 9.06 | 14.60 |
| d52 | 11.00 | 13.24 | 13.49 |
| Incident pupil | 95.54 | 131.34 | 362.43 |
| Exit pupil | 297.22 | 213.99 | 271.31 |
| Front principal point | 106.17 | 152.27 | 533.68 |
| Rear principal point | −0.27 | −9.15 | −107.99 |

Zoom lens group data

| Group | Starting surface | Focal length | Lens length | Front principal point | Rear principal point |
|---|---|---|---|---|---|
| 1 | 1 | 112.95 | 165.93 | 118.06 | 67.49 |
| 2 | 21 | −38.77 | 27.99 | 3.20 | −20.02 |
| 3 | 31 | −152.82 | 4.60 | −0.34 | −2.86 |
| 4 | 34 | 93.48 | 21.81 | 3.87 | −10.91 |
| 5 | 41 | 412.98 | 20.02 | 22.16 | 10.41 |
| 6 | 48 | 84.71 | 19.69 | 6.96 | −5.88 |
| G | 53 | ∞ | 69.00 | 21.00 | −21.00 |

Single lens data

| Lens | Starting surface | Focal length |
|---|---|---|
| 1 | 1 | −225.57 |
| 2 | 3 | −261.07 |
| 3 | 5 | −241.18 |
| 4 | 7 | 216.76 |
| 5 | 9 | 1583.22 |
| 6 | 11 | 195.47 |
| 7 | 12 | −407.92 |
| 8 | 14 | −186.63 |
| 9 | 15 | 179.95 |
| 10 | 17 | 203.12 |
| 11 | 19 | 533.51 |
| 12 | 21 | −72.94 |
| 13 | 22 | −424.18 |
| 14 | 24 | −65.21 |
| 15 | 26 | 604.42 |
| 16 | 27 | −179.30 |
| 17 | 29 | 107.58 |
| 18 | 31 | −91.98 |
| 19 | 32 | 233.42 |
| 20 | 35 | 57.18 |
| 21 | 36 | −50.75 |
| 22 | 38 | 60.72 |
| 23 | 39 | −238.99 |
| 24 | 41 | 79.79 |
| 25 | 43 | −35.41 |
| 26 | 44 | 73.04 |
| 27 | 46 | 270.89 |
| 28 | 48 | 62.12 |
| 29 | 49 | −54.02 |
| 30 | 51 | 72.00 |

NUMERICAL EXAMPLE 3

Unit mm

Surface data

| Surface number | r | d | nd | vd | Effective diameter | θgF |
|---|---|---|---|---|---|---|
| 1 | 195.383 | 3.80 | 1.74320 | 49.3 | 143.93 | 0.5530 |
| 2 | 88.065 | 24.76 | | | 124.49 | |
| 3 | 770.513 | 3.30 | 1.69680 | 55.5 | 123.36 | 0.5433 |
| 4 | 139.820 | 22.05 | | | 116.52 | |
| 5 | −225.055 | 3.20 | 1.65160 | 58.5 | 116.12 | 0.5426 |
| 6 | 531.264 | 0.20 | | | 117.14 | |
| 7 | 202.552 | 11.51 | 1.90200 | 25.1 | 118.72 | 0.6117 |
| 8 | −2848.156 | 4.29 | | | 118.41 | |
| 9 | −541.708 | 5.54 | 1.43387 | 95.1 | 117.84 | 0.5373 |
| 10 | −305.166 | 1.90 | | | 117.34 | |
| 11 | ∞ | 20.50 | 1.49700 | 81.5 | 114.14 | 0.5374 |
| 12 | −98.503 | 3.60 | 1.73800 | 32.3 | 113.45 | 0.5899 |
| 13 | −145.857 | 22.77 | | | 113.69 | |
| 14 | 317.012 | 3.80 | 1.72342 | 38.0 | 100.94 | 0.5836 |
| 15 | 94.373 | 16.97 | 1.49700 | 81.5 | 97.39 | 0.5374 |
| 16 | −1523.805 | 0.20 | | | 97.79 | |
| 17 | 145.693 | 16.68 | 1.43387 | 95.1 | 99.69 | 0.5373 |
| 18 | −214.060 | 0.20 | | | 99.52 | |
| 19 | 139.178 | 5.81 | 1.59282 | 68.6 | 94.57 | 0.5446 |
| 20 | 254.681 | (Variable) | | | 93.67 | |
| 21* | 1199.135 | 2.00 | 1.59282 | 68.6 | 45.73 | 0.5446 |
| 22 | 56.000 | 0.50 | 1.61937 | 19.2 | 40.85 | 0.7478 |
| 23 | 34.800 | 9.81 | | | 38.67 | |
| 24 | −54.192 | 2.00 | 1.59282 | 68.6 | 38.40 | 0.5446 |

-continued

Unit mm

| | | | | | | |
|---|---|---|---|---|---|---|
| 25 | 89.921 | 5.18 | | | 37.93 | |
| 26 | −143.322 | 2.70 | 1.69895 | 30.1 | 38.22 | 0.6029 |
| 27 | −92.651 | 2.00 | 1.49700 | 81.5 | 38.62 | 0.5374 |
| 28 | 542.666 | 0.20 | | | 39.38 | |
| 29 | 105.168 | 4.60 | 1.84666 | 23.8 | 39.90 | 0.6205 |
| 30 | −279.647 | (Variable) | | | 39.86 | |
| 31 | −104.337 | 1.70 | 1.78800 | 47.4 | 34.14 | |
| 32 | 216.161 | 2.90 | 1.84666 | 23.9 | 35.06 | |
| 33 | −841.671 | (Variable) | | | 35.52 | |
| 34 (Aperture) | ∞ | 1.50 | | | 37.05 | |
| 35* | 78.603 | 7.20 | 1.66672 | 48.3 | 38.52 | |
| 36 | −75.594 | 2.00 | 1.49700 | 81.5 | 38.62 | |
| 37 | 39.839 | 0.79 | | | 38.48 | |
| 38 | 41.367 | 8.73 | 1.49700 | 81.5 | 38.90 | |
| 39 | −101.796 | 1.80 | 1.80400 | 46.6 | 38.90 | |
| 40 | −254.594 | (Variable) | | | 39.09 | |
| 41 | 1876.700 | 5.68 | 1.80809 | 22.8 | 42.41 | |
| 42 | −65.792 | 0.20 | | | 42.62 | |
| 43 | −85.558 | 2.00 | 1.90200 | 25.1 | 42.19 | |
| 44 | 51.288 | 8.93 | 1.49700 | 81.5 | 42.61 | |
| 45 | −115.293 | 0.20 | | | 43.34 | |
| 46 | 254.253 | 3.00 | 1.80809 | 22.8 | 44.30 | |
| 47 | −2366.247 | (Variable) | | | 44.45 | |
| 48 | 64.755 | 11.00 | 1.49700 | 81.5 | 45.15 | |
| 49 | −54.022 | 1.80 | 1.90200 | 25.1 | 44.82 | |
| 50 | 423.189 | 0.20 | | | 45.37 | |
| 51 | 150.873 | 6.69 | 1.80809 | 22.8 | 45.69 | |
| 52 | −91.538 | (Variable) | | | 45.68 | |
| 53 | ∞ | 50.00 | 1.69680 | 55.5 | 39.35 | |
| 54 | ∞ | 19.00 | 1.51633 | 64.1 | 26.17 | |
| 55 | ∞ | 10.00 | | | 20.56 | |
| Image plane | ∞ | | | | | |

Aspheric surface data

21st Surface

K = −3.67025e+003    A4 = 7.57894e−007    A6 = −8.83997e−010
A8 = 2.46028e−013

35th Surface

K = −5.20666e+000    A4 = 4.49636e−007    A6 = −2.19653e−010
A8 = −2.47346e−014

Various data
Zoom ratio 11.50

| | Wide-angle | Intermediate | Telephoto |
|---|---|---|---|
| Focal length | 10.26 | 28.86 | 118.00 |
| F Number | 1.84 | 1.87 | 2.05 |
| Field angle | 37.94 | 15.50 | 3.88 |
| Image height | 8.00 | 8.00 | 8.00 |
| Lens full length | 544.68 | 544.68 | 544.68 |
| BF | 9.99 | 9.99 | 9.99 |
| d20 | 5.00 | 70.77 | 123.25 |
| d30 | 126.78 | 31.35 | 3.21 |
| d33 | 3.75 | 18.50 | 2.00 |
| d40 | 51.74 | 54.65 | 45.00 |
| d47 | 1.00 | 9.82 | 13.39 |
| d52 | 11.00 | 14.18 | 12.41 |
| Incident pupil | 94.96 | 160.20 | 354.79 |
| Exit pupil | 297.32 | 201.40 | 278.95 |
| Front principal point | 105.59 | 193.41 | 524.43 |
| Rear principal point | −0.28 | −18.87 | −107.94 |

Zoom lens group data

| Group | Starting surface | Focal length | Lens length | Front principal point | Rear principal point |
|---|---|---|---|---|---|
| 1 | 1 | 108.84 | 171.10 | 118.27 | 67.81 |
| 2 | 21 | −39.52 | 28.99 | 1.59 | −23.87 |
| 3 | 31 | −159.88 | 4.60 | −0.45 | −2.98 |
| 4 | 34 | 96.88 | 22.02 | 3.65 | −11.34 |
| 5 | 41 | 417.84 | 20.02 | 21.97 | 10.19 |
| 6 | 48 | 84.37 | 19.69 | 6.93 | −5.92 |
| G | 53 | ∞ | 69.00 | 21.00 | −21.00 |

Single lens data

| Lens | Starting surface | Focal length |
|---|---|---|
| 1 | 1 | −219.04 |
| 2 | 3 | −245.67 |
| 3 | 5 | −242.21 |
| 4 | 7 | 210.03 |
| 5 | 9 | 1599.43 |
| 6 | 11 | 198.11 |
| 7 | 12 | −424.84 |
| 8 | 14 | −187.09 |
| 9 | 15 | 179.44 |
| 10 | 17 | 202.65 |
| 11 | 19 | 508.15 |
| 12 | 21 | −99.16 |
| 13 | 22 | −149.77 |
| 14 | 24 | −56.75 |
| 15 | 26 | 366.90 |
| 16 | 27 | −159.07 |
| 17 | 29 | 90.77 |
| 18 | 31 | −89.09 |
| 19 | 32 | 203.40 |
| 20 | 35 | 58.90 |
| 21 | 36 | −52.19 |
| 22 | 38 | 60.41 |
| 23 | 39 | −212.08 |
| 24 | 41 | 78.76 |
| 25 | 43 | −35.31 |
| 26 | 44 | 72.72 |
| 27 | 46 | 284.25 |
| 28 | 48 | 61.14 |
| 29 | 49 | −53.02 |
| 30 | 51 | 71.38 |

NUMERICAL EXAMPLE 4

Unit mm

Surface data

| Surface number | r | d | nd | vd | Effective diameter | θgF |
|---|---|---|---|---|---|---|
| 1 | 316.753 | 2.24 | 1.80518 | 25.4 | 102.40 | 0.6161 |
| 2 | 130.440 | 13.29 | 1.56907 | 71.3 | 95.67 | 0.5451 |
| 3 | −9313.789 | 0.19 | | | 91.74 | |
| 4 | 98.992 | 8.96 | 1.43875 | 94.9 | 76.68 | 0.5343 |
| 5 | 633.886 | 0.19 | | | 73.24 | |
| 6 | 58.633 | 9.54 | 1.43875 | 94.9 | 62.79 | 0.5343 |
| 7 | 163.605 | (Variable) | | | 60.05 | |
| 8* | 157.406 | 1.92 | 1.59282 | 68.6 | 41.56 | 0.5446 |
| 9 | 18.953 | 7.74 | | | 28.90 | |
| 10 | 258.048 | 1.12 | 1.59282 | 68.6 | 27.02 | 0.5446 |
| 11 | 32.714 | 0.32 | 1.61937 | 19.2 | 24.51 | 0.7478 |
| 12 | 25.247 | 3.55 | | | 23.79 | |
| 13 | 316.365 | 1.28 | 1.72916 | 54.7 | 23.28 | 0.5444 |
| 14 | 34.154 | 0.24 | | | 22.14 | |
| 15 | 25.467 | 7.75 | 1.80809 | 22.8 | 21.98 | 0.6307 |
| 16 | 219.163 | 0.63 | | | 19.15 | |
| 17 | −244.972 | 1.60 | 1.72916 | 54.7 | 18.93 | 0.5444 |
| 18 | 143.560 | (Variable) | | | 17.98 | |
| 19 (Aperture) | ∞ | (Variable) | | | 15.45 | |
| 20 | 38.552 | 1.28 | 1.90270 | 31.0 | 16.93 | |

-continued

Unit mm

| | | | | | |
|---|---|---|---|---|---|
| 21 | 30.234 | 4.16 | 1.45000 | 70.2 | 16.80 |
| 22 | −194.073 | 0.24 | | | 16.98 |
| 23 | 72.417 | 6.88 | 1.56963 | 70.0 | 17.03 |
| 24 | −18.959 | 1.44 | 1.86687 | 40.0 | 17.76 |
| 25 | −33.160 | (Variable) | | | 18.72 |
| 26 | −88.262 | 4.22 | 1.84666 | 23.8 | 19.27 |
| 27 | −32.635 | 1.28 | 1.76200 | 40.1 | 20.05 |
| 28 | 175.443 | 13.92 | | | 20.78 |
| 29 | −45.452 | 1.92 | 1.60311 | 60.6 | 26.72 |
| 30 | −161.238 | (Variable) | | | 28.53 |
| 31 | 203.416 | 9.24 | 1.43875 | 94.9 | 37.78 |
| 32* | −37.372 | 0.19 | | | 39.30 |
| 33 | 63.849 | 13.54 | 1.43875 | 94.9 | 41.40 |
| 34 | −40.250 | 3.36 | 1.74950 | 35.3 | 41.19 |
| 35 | −113.706 | (Variable) | | | 42.38 |
| Image plane | ∞ | | | | |

Aspheric surface data

8th Surface

K = −2.85174e+001  A4 = −1.81277e−006  A6 = 2.28762e−009
A8 = −3.85154e−012  A10 = 2.83005e−015  A12 = 9.55612e−019

32nd Surface

K = −1.70012e+000  A4 = −1.61311e−006  A6 = 3.66797e−010
A8 = 7.38365e−012  A10 = −1.54765e−014  A12 = 8.38691e−018

Various data
Zoom ratio 4.67

| | Wide-angle | Intermediate | Telephoto |
|---|---|---|---|
| Focal length | 28.21 | 56.11 | 131.85 |
| F Number | 4.12 | 4.89 | 5.77 |
| Field angle | 37.48 | 21.09 | 9.32 |
| Image height | 21.64 | 21.64 | 21.64 |
| Lens full length | 224.00 | 242.67 | 266.43 |
| BF | 55.79 | 70.40 | 82.95 |
| d7 | 1.38 | 20.40 | 42.67 |
| d18 | 19.89 | 12.30 | 4.61 |
| d19 | 13.42 | 6.05 | 2.69 |
| d25 | 1.18 | 5.70 | 10.25 |
| d30 | 10.10 | 5.58 | 1.01 |
| d35 | 55.79 | 70.40 | 82.95 |
| Incident pupil | 54.85 | 101.91 | 212.36 |
| Exit pupil | −1142.27 | −196.36 | −123.10 |
| Front principal point | 82.40 | 146.21 | 259.85 |
| Rear principal point | 27.57 | 14.29 | −48.90 |

Zoom lens group data

| Group | Starting surface | Focal length | Lens length | Front principal point | Rear principal point |
|---|---|---|---|---|---|
| 1 | 1 | 107.20 | 34.42 | 10.01 | −12.89 |
| 2 | 8 | −18.43 | 26.16 | 5.56 | −12.79 |
| SP | 19 | ∞ | 0.00 | 0.00 | −0.00 |
| 3 | 20 | 36.36 | 14.00 | 4.90 | −4.64 |
| 4 | 26 | −44.29 | 21.34 | 7.26 | −9.66 |
| 5 | 31 | 51.50 | 26.33 | 6.00 | −12.20 |

Single lens data

| Lens | Starting surface | Focal length |
|---|---|---|
| 1 | 1 | −276.91 |
| 2 | 2 | 226.17 |
| 3 | 4 | 266.02 |
| 4 | 6 | 202.66 |
| 5 | 8 | −36.54 |
| 6 | 10 | −63.31 |
| 7 | 11 | −181.57 |
| 8 | 13 | −52.61 |
| 9 | 15 | 35.03 |

-continued

Unit mm

| | | |
|---|---|---|
| 10 | 17 | −123.92 |
| 11 | 20 | −167.46 |
| 12 | 21 | 58.47 |
| 13 | 23 | 27.12 |
| 14 | 24 | −53.59 |
| 15 | 26 | 59.10 |
| 16 | 27 | −36.01 |
| 17 | 29 | −105.61 |
| 18 | 31 | 72.81 |
| 19 | 33 | 58.59 |
| 20 | 34 | −84.79 |

NUMERICAL EXAMPLE 5

Unit mm

Surface data

| Surface number | r | d | nd | vd | Effective diameter | θgF |
|---|---|---|---|---|---|---|
| 1 | 131.487 | 3.19 | 1.84666 | 23.8 | 84.36 | 0.6205 |
| 2 | 91.088 | 13.76 | 1.49700 | 81.5 | 80.76 | 0.5374 |
| 3 | −917.791 | 0.28 | | | 79.17 | |
| 4 | 83.177 | 7.18 | 1.56907 | 71.3 | 72.03 | 0.5451 |
| 5 | 191.287 | (Variable) | | | 70.17 | |
| 6* | 73.030 | 0.07 | 1.51742 | 52.4 | 40.26 | 0.5564 |
| 7 | 77.767 | 1.88 | 1.72916 | 54.7 | 40.18 | 0.5444 |
| 8 | 19.799 | 9.80 | | | 29.97 | |
| 9 | −63.927 | 1.61 | 1.77250 | 49.6 | 28.20 | 0.5521 |
| 10 | 91.842 | 0.32 | 1.61937 | 19.2 | 26.57 | 0.7478 |
| 11 | 49.795 | 0.21 | | | 26.13 | |
| 12 | 29.437 | 7.18 | 1.84666 | 23.8 | 25.69 | 0.6205 |
| 13 | −53.513 | 0.63 | | | 23.95 | |
| 14 | −39.182 | 1.42 | 1.83481 | 42.7 | 23.42 | 0.5642 |
| 15 | 53.633 | (Variable) | | | 21.35 | |
| 16 (Aperture) | ∞ | 0.87 | | | 22.08 | |
| 17 | 42.969 | 1.29 | 1.80518 | 25.4 | 23.23 | |
| 18 | 24.170 | 6.76 | 1.49700 | 81.5 | 23.21 | |
| 19 | −70.641 | 0.10 | | | 23.84 | |
| 20* | 41.273 | 4.93 | 1.48749 | 70.2 | 24.33 | |
| 21 | −130.825 | (Variable) | | | 24.09 | |
| 22 | −104.845 | 2.93 | 1.84666 | 23.8 | 23.70 | |
| 23 | −26.456 | 0.96 | 1.75700 | 47.8 | 23.81 | |
| 24 | 70.908 | (Variable) | | | 24.30 | |
| 25 | −23.037 | 1.45 | 1.77250 | 49.6 | 24.60 | |
| 26 | −33.297 | (Variable) | | | 26.40 | |
| 27 | 64.945 | 8.14 | 1.58313 | 59.4 | 30.18 | |
| 28* | −30.906 | 0.24 | | | 30.80 | |
| 29 | 139.584 | 9.07 | 1.48749 | 70.2 | 29.90 | |
| 30 | −24.498 | 1.52 | 1.80100 | 35.0 | 29.42 | |
| 31 | −569.768 | (Variable) | | | 30.31 | |
| Image plane | ∞ | | | | | |

Aspheric surface data

6th Surface

K = 0.00000e+000  A4 = −1.87017e−006  A6 = 4.30515e−009
A8 = −2.20373e−011  A10 = 5.73701e−014  A12 = −4.03876e−017

20th Surface

K = 0.00000e+000  A4 = 1.13609e−006  A6 = −6.20657e−010
A8 = 9.23654e−012  A10 = −1.72976e−014

28th Surface

K = −6.36581e−001  A4 = 1.61737e−006  A6 = 7.30426e−010
A8 = −4.62842e−012  A10 = 3.46015e−016  A12 = −1.12167e−018

-continued

Unit mm

Various data
Zoom ratio 10.31

|  | Wide-angle | Intermediate | Telephoto |
|---|---|---|---|
| Focal length | 29.77 | 93.64 | 307.06 |
| F Number | 3.31 | 4.71 | 5.85 |
| Field angle | 36.00 | 13.01 | 4.03 |
| Image height | 21.64 | 21.64 | 21.64 |
| Lens full length | 209.34 | 263.66 | 304.01 |
| BF | 61.72 | 89.40 | 106.84 |
| d5 | 2.75 | 46.02 | 81.01 |
| d15 | 34.30 | 17.70 | 5.62 |
| d21 | 7.47 | 14.85 | 18.83 |
| d24 | 4.50 | 4.59 | 5.26 |
| d26 | 12.83 | 5.34 | 0.69 |
| d31 | 61.72 | 89.40 | 106.84 |
| Incident pupil | 49.91 | 165.46 | 444.43 |
| Exit pupil | −105.51 | −73.09 | −59.23 |
| Front principal point | 74.38 | 205.14 | 183.72 |
| Rear principal point | 31.95 | −4.24 | −200.22 |

Zoom lens group data

| Group | Starting surface | Focal length | Lens length | Front principal point | Rear principal point |
|---|---|---|---|---|---|
| 1 | 1 | 142.35 | 24.41 | 4.31 | −11.53 |
| 2 | 6 | −19.20 | 23.11 | 7.05 | −8.05 |
| 3 | 16 | 36.39 | 13.95 | 5.33 | −4.47 |
| 4 | 22 | −64.59 | 3.89 | 1.12 | −0.99 |
| 5 | 25 | −103.14 | 1.45 | −1.96 | −2.83 |
| 6 | 27 | 46.36 | 18.96 | −0.26 | −11.80 |

Single lens data

| Lens | Starting surface | Focal length |
|---|---|---|
| 1 | 1 | −363.30 |
| 2 | 2 | 167.49 |
| 3 | 4 | 252.53 |
| 4 | 6 | 2306.18 |
| 5 | 7 | −36.93 |
| 6 | 9 | −48.57 |
| 7 | 10 | −176.12 |
| 8 | 12 | 23.36 |
| 9 | 14 | −26.93 |
| 10 | 17 | −70.78 |
| 11 | 18 | 37.11 |
| 12 | 20 | 64.97 |
| 13 | 22 | 41.09 |
| 14 | 23 | −25.35 |
| 15 | 25 | −103.14 |
| 16 | 27 | 37.07 |
| 17 | 29 | 43.54 |
| 18 | 30 | −32.00 |

TABLE 2

Table-2

| Embodi-ment | Conditional expression | | | | | | |
|---|---|---|---|---|---|---|---|
|  | (1) | (2) | (3) | (4) | (5) | (6) | (7) |
| 1 | 0.0789 | 8.96E−04 | 81.5 | 0.0278 | −0.636 | 68.6 | 0.212 |
| 2 | 0.0789 | 6.49E−04 | 68.6 | 0.0144 | −1.258 | 68.6 | 0.154 |
| 3 | 0.0789 | 1.87E−03 | 81.5 | 0.0278 | −1.198 | 68.6 | 0.379 |
| 4 | 0.0789 | 7.21E−04 | 71.3 | 0.0192 | −1.246 | 68.6 | 0.201 |
| 5 | 0.0789 | 7.74E−04 | 81.5 | 0.0278 | −0.951 | 54.7 | 0.210 |

FIG. 11 is a schematic diagram of an essential part of a digital still camera including a zoom lens of the embodiments. In FIG. 11, reference numeral 20 denotes a camera main body and reference numeral 21 denotes an image taking optical system including one of the zoom lenses described in each embodiment. Reference numeral 22 denotes a solid-state image sensing element (photoelectric conversion element) such as a CCD sensor or a CMOS sensor which is built in the camera main body 20 and receives an object image formed by the image taking optical system 21. In addition, for example, the zoom lenses of the first to the third embodiments among the zoom lenses of each embodiment can be well applied to an image pickup apparatus of a color separation optical system on the image side of a TV camera and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023699 filed Feb. 7, 2011, which is hereby incorporated by reference herein in its entirety.

What is claimed is:

1. A zoom lens comprising:
in order from an object side to an image side,
a first lens unit having a positive refractive power;
a second lens unit having a negative refractive power; and
a rear group including one or more lens units,
wherein an aperture stop is included on the image side of the second lens unit, and the second lens unit and at least one of the lens units included in the rear group move during zooming, and
when an Abbe number and a partial dispersion ratio of a material of a refractive optical element j1 having a negative refractive power included in the second lens unit are defined as $vdj1$ and $\theta gFj1$ respectively, a focal length of the refractive optical element j1 is defined as $fj1$, a focal length of the second lens unit is defined as $f2$, and an anomalous partial dispersion ratio $\Delta\theta gFj1$ of the refractive optical element j1 is calculated as $\Delta\theta gFj1 = \theta gFj1 - (-0.001682 vdj1 + 0.6438)$, conditional expressions below are satisfied:

$$0 < \theta gFj1 - (-1.7\times10^{-7} \times vdj1^3 + 5.3\times10^{-5} \times vdj1^2 - 5.7\times10^{-3} \times vdj1 + 0.76) < 0.4,$$

and $$0.5\times10^{-3} < \Delta\theta gFj1/vdj1 \times f2/fj1 < 2.0\times10^{-3}.$$

2. The zoom lens according to claim 1, wherein
when an Abbe number and a partial dispersion ratio of a material of a refractive optical element j2 having a positive refractive power included in the first lens unit are defined as $vdj2$ and $\theta gFj2$ respectively and a focal length of the refractive optical element j2 is defined as $fj2$, conditional expressions below are satisfied:

$$65 < vdj2 < 100$$

$$0 < \theta gFj2 - (-1.6\times10^{-3} \times vdj2 + 0.64) < 0.4,$$

and $$-1.3 < fj2/fj1 < -0.6.$$

3. The zoom lens according to claim 1, wherein
when an Abbe number of a material of a refractive optical element j3 having a negative refractive power included in the second lens unit is defined as $vdj3$ and a focal length of the refractive optical element j3 is defined as fj3, conditional expressions below are satisfied:

$$50 < vdj3 < 100$$

and $$0.1 < (fj3/fj1) < 0.4.$$

4. The zoom lens according to claim 1, wherein the rear group includes, in order from the object side to the image side, a third lens unit having a negative refractive power, a fourth lens unit having a positive refractive power, a fifth lens unit having a positive refractive power, and a sixth lens unit having a positive refractive power, and
the third to the sixth lens units move during zooming.

5. The zoom lens according to claim 1, wherein the rear group includes, in order from the object side to the image side, a third lens unit having a positive refractive power, a fourth lens unit having a negative refractive power, and a fifth lens unit having a positive refractive power, and
the third to the fifth lens units move during zooming.

6. An image pickup apparatus comprising:
a zoom lens comprising;
in order from an object side to an image side,
a first lens unit having a positive refractive power;
a second lens unit having a negative refractive power; and
a rear group including one or more lens units,
wherein an aperture stop is included on the image side of the second lens unit, and the second lens unit and at least one of the lens units included in the rear group move during zooming, and
when an Abbe number and a partial dispersion ratio of a material of a refractive optical element j1 having a negative refractive power included in the second lens unit are defined as vdj1 and θgFj1 respectively, a focal length of the refractive optical element j1 is defined as fj1, a focal length of the second lens unit is defined as f2, and an anomalous partial dispersion ratio ΔθgFj1 of the refractive optical element j1 is calculated as ΔθgFj1=θgFj1−(−0.001682vdj1+0.6438), conditional expressions below are satisfied:

$$0 < \theta gFj1 - (-1.7 \times 10^{-7} \times vdj1^3 + 5.3 \times 10^{-5} \times vdj1^2 - 5.7 \times 10^{-3} \times vdj1 + 0.76) < 0.4, \text{ and}$$

$$0.5 \times 10^{-3} < \Delta\theta gFj1/vdj1 \times f2/fj1 < 2.0 \times 10^{-3}; \text{ and}$$

an image pickup device configured to receive an image formed by the zoom lens.

* * * * *